(12) United States Patent
Shinjo et al.

(10) Patent No.: US 8,145,665 B2
(45) Date of Patent: Mar. 27, 2012

(54) BIT STRING SEARCH APPARATUS, SEARCH METHOD, AND PROGRAM

(75) Inventors: Toshio Shinjo, Chiba (JP); Mitsuhiro Kokubun, Chiba (JP)

(73) Assignee: S. Grants Co., Ltd., Chiba (JP)

( * ) Notice: Subject to any disclaimer, the term of this patent is extended or adjusted under 35 U.S.C. 154(b) by 267 days.

(21) Appl. No.: 12/654,778

(22) Filed: Dec. 31, 2009

(65) Prior Publication Data
US 2010/0174741 A1    Jul. 8, 2010

Related U.S. Application Data

(63) Continuation of application No. PCT/JP2008/001731, filed on Jul. 2, 2008.

(30) Foreign Application Priority Data

Jul. 3, 2007  (JP) .................................. 2007-175570

(51) Int. Cl.
G06F 7/00   (2006.01)
G06F 17/30  (2006.01)

(52) U.S. Cl. ......... 707/769; 707/758; 707/803; 707/812

(58) Field of Classification Search .................. 707/758, 707/769, 803, 812
See application file for complete search history.

(56) References Cited

U.S. PATENT DOCUMENTS
6,675,163 B1 * 1/2004 Bass et al. ............................. 1/1

FOREIGN PATENT DOCUMENTS
JP   10-177582 A    6/1998
JP   11-103318 A    4/1999
JP   2001-357070 A  12/2001
(Continued)

OTHER PUBLICATIONS

Susumu Yata et al., "Succinct Array Structure of Patricia Trie", vol. 107 No. 127, pp. 101-106, IEICE Technical Report (Jun. 22, 2007).

(Continued)

*Primary Examiner* — Shahid Alam
*Assistant Examiner* — Joshua Bullock
(74) *Attorney, Agent, or Firm* — Rader, Fishman & Grauer PLLC

(57) ABSTRACT

Provided is a search method which is appropriate for handling a don't-care bit. A coupled node tree comprises a root node and a node pair, the node pair being a branch node and leaf node, or a pair of branch nodes, or a pair of leaf nodes located in adjacent storage areas. The branch node includes a discrimination bit position of a search key for the bit string search, which key is encoded so as to distinguish between don't-care bits and significant bits, and position information indicating a position of a primary node, which is one node of a node pair of a link target. A leaf node includes an index key which is a bit string in the status of either being or not being encoded. A search that takes in account the don't-care bit is performed by repeatedly linking in sequence to one of the nodes of a node pair that is the link target in accordance with the bit value of the search key at the discrimination bit position of a branch node until a leaf node is reached, and by tracing back up the path to the leaf node as necessary.

18 Claims, 19 Drawing Sheets

FOREIGN PATENT DOCUMENTS

| | | |
|---|---|---|
| JP | 2003-224581 A | 8/2003 |
| WO | WO 2008/004335 A1 | 1/2008 |
| WO | WO 2008/053583 A1 | 5/2008 |
| WO | WO 2008/065735 A1 | 6/2008 |
| WO | WO 2008/090588 A1 | 7/2008 |

OTHER PUBLICATIONS

"*Patorishia Tsuri (Patricia Tree)*", vol. 11, No. 2, pp. 337-339, Journal of Japanese Society for Artificial Intelligence (Mar. 1, 1996).

International Search Report mailed on Oct. 7, 2008.

Li, et al., "Stateful Inspection Firewall Session Table Processing", School of Computer Science and Technology, Harbin Institute of Technology, International Journal of Information Technology, vol. 11, No. 2, 2005, pp. 21-30.

Supplemental European Search Report from European Patent Office for Application No. 08790130.2-2201 dated Aug. 16, 2011.

Nilsson et al., "IP-Address Lookup Using LC-Tries", IEEE Journal on Selected Areas in Communications, IEEE Service Center, Piscataway US, vol. 17, No. 6, Jun. 1, 1999, pp. 1083-1092.

Sedgewick, "Algorithmen, 2.Auflage, Kapitel 17: Digitales Suchen", 2002, Addison-Wesley, Muchen, pp. 289-303.

Ruiz-Sanchez et al., "Survey and Taxonomy of IP Address Lookup Algorithms", IEEE Network, IEEE Service Center, New York, NY, US, vol. 15, No. 2, Mar. 1, 2001, pp. 8-23.

Sklower, "A Tree-Based Packet Routing Table for Berkeley Unix", Proceedings of the Usenix CC+++. Berkeley, CA, US, Jan. 21, 1991, pp. 93-103.

* cited by examiner

BIT STRING SEARCH APPARATUS, SEARCH METHOD, AND PROGRAM

CROSS-REFERENCE TO RELATED APPLICATION

This application is a continuation of PCT/JP2008/001731 filed on Jul. 2, 2008, and is based and claims the benefit of priority of the prior Japanese Patent Application No. 2007-175570, filed on Jul. 3, 2007, the entire contents of which are incorporated herein by reference. The contents of PCT/JP2008/001731 are incorporated herein by reference in their entity.

BACKGROUND OF THE INVENTION

1. Field of the Invention

This invention is related to the art of searching for a desired bit string within a set of bit strings using a data configuration in the form of a tree that stores the bit strings.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys.

Because the index keys can be expressed as bit strings, the searching of a database is equivalent to searching for bit strings in the database.

In order to perform the above-noted searching for bit strings at high speed, conventional art makes various refinements on the data structure in which bit strings are stored. One of these is a tree structure known as a Patricia tree.

FIG. 1 shows an example of a Patricia tree used for search processing in the above-noted conventional art. A node of a Patricia tree is formed to include an index key, a test bit position for a search key, and right and left link pointers. Although it is not explicitly shown, a node of course includes information for the purpose of accessing a record corresponding to the index key.

In the example shown in FIG. 1, the node 1750a that holds the index key "100010" is a root node, the test bit position 1730a of which is 0. The node 1750b is connected to the left link 1740a of the node 1750a, and the node 1750f is connected to the right link 1741a of the node 1750a.

The index key held by the node 1750b is "010011", and the test bit position 1730b is 1. The node 1750c is connected to the left link 1740b of the node 1750b, and the node 1750d is connected to the right link 1741b of the node 1750b. The index key held by the node 1750c is "000111", and the test bit position is 3. The index key held by the node 1750d is "011010", and the test bit position is 2.

The parts connected to the node 1750c by a solid lines show the right and left link pointers of the node 1750c, and the left pointer 1740c that is not connected by the dotted line indicates that field is blank. The dotted line connection destination of the right pointer 1741c that is connected by a dotted line expresses the address indicated by the pointer, and in this case this indicates that the right pointer points to the node 1750c.

The right pointer 1741d of the node 1750d points to the node 1750d itself, and the node 1750e is connected to the left link 1740d. The index key held by 1750e is "010010", and the test bit position is 5. The left pointer 1740e of the node 1750e points to the node 1750b, and the right pointer 1741e of the node 1750e points to the node 1750e.

The index key held by the node 1750f is "101011", and the test bit position 1730f is 2. The node 1750g is connected to the left link 1740f of the node 1750f and the node 1750h is connected to the right link 1741f of the node 1750f.

The index key held by the node 1750g is "100011", and the test bit position 1730g is 5. The left pointer 1740g of the node 1750g points to the node 1750a, and the right pointer 1741g of the node 1750g points to the node 1750g.

The index key held by the node 1750h is "101100", and the test bit position 1730h is 3. The left pointer 1740h of the node 1750h points to the node 1750f, and the right pointer 1741h of the node 1750h points to the node 1750h.

In the example of FIG. 1, the configuration is such that, as the tree is traversed downward from the root node 1750a the test bit position of successive nodes increases. When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0. Unless the test bit position of a link target node is larger than the bit position of the link origin node, that is, if the link target is not below but rather returns upward (the returning links shown by the dotted lines in FIG. 1 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, delay in the search processing by comparison with an index key for the first time by returning by a back link, and the difficulty of data maintenance such as adding and deleting a node.

In order to resolve these disadvantages of the Patricia tree, there is, for example, the technology disclosed in Patent Reference 1 below. In the Patricia tree described in Patent Reference 1 below, by storing lower level sibling nodes in a contiguous area, the space need for pointers is reduced as well as by setting a bit in each node to show whether or not the next link is a back link the determination processing for back links is reduced.

However, even in the disclosure of Patent Reference 1 below, since each node always reserves an area for the index key and the area for a pointer, and a single pointer is used for storing lower level sibling nodes in a contiguous area as shown for example even in the parts of left pointer 1740c, right pointer 1741h, etc. that are the lowest level parts of the Patricia shown in FIG. 1, the same amount of space must be allocated, etc., and there is not a very big space reduction effect. Also the problem of the delay in the search processing caused by a back links, and the difficulty of processing such as adding and deleting, etc., is not improved.

On one hand, there are cases in the processing of bit strings where some of the bits should be treated as non-significant "don't care" bits. For example, in searching a routing table in a router, it is preferable to treat the network address part as significant bits and the host address part as "don't care" bits in the bit string expressing an IP (Internet Protocol) address.

Patent Reference 2 recites an art of a longest-match search circuit for speeding up a longest-match search method using a Patricia tree and illustrates the correspondence relationship between nodes in a Patricia tree and bit strings that have "don't-care" bits. Also Patent Reference 2 recites an art of applying that longest-match search circuit to a routing table search system.

On the other hand, not only IP addresses, but also all kinds of classification codes support bit strings that express both individual bit string values and the contents of a hierarchical classification expressed in that bit string, and the higher the order of the bits the higher the hierarchical level they express. In searches for this kind of a bit string, cases exist wherein searches are performed with a bit string where the search key has a lower order part of bits as "don't care" bits".

This is due to the fact that it is desirable to know whether or not an index key exists with the classification associated with that of the bit string specified as the search key, and if none such exists, to know the lowest order classification among the higher level classifications associated with the bit string specified as the search key, in other words, to know what classification is the closest to that expressed in the search key.

In this way, it is desirable to perform a longest-match search while considering don't-care bits. Also, even in functions such as ordinary character string searches, there are demands for the realization of flexible searches by means of searches that allow don't-care bits to be included in both the bit strings used as search keys and the index keys that are the object of searches.

Still, the previous means for speeding up a longest-match search have required cumbersome preprocessing and have a high cost for data maintenance. No means is known that satisfies all the requirements that a longest-match search taking in account don't-care bits exists, that the search is high speed, and that the maintenance costs are low.

For example, in the IP address search table creation method recited in Patent Reference 3, in the case wherein the range of the IP addresses for the first entry are included in the range of the IP addresses for the second entry, the first entry is decomposed into the third and fourth entries that comprise the first entry and the first entry is deleted. Then, the third and the fourth entries are each compared with the second entry and the decomposed entry that matches is deleted.

The decomposition repeatedly expands the range of "1's" in the value of the subnet mask one at a time until the decomposed entry coincides with the second entry. Since the inclusion relationship between the two entries is dissolved by the decomposition, a hardware based high-speed search appliance can consistently enable the execution of a correct longest-match search. However, since the inclusion relationship changes whenever an entry is added or deleted, the cost of data maintenance is high.

Also Patent Reference 4 recites a method for speeding up a longest-match search of things like a word dictionary in natural language processing. This method first sorts the record groups in ascending order according to a key item (words registered in a dictionary). Then, for each record, in the records preceding that record, the number of the record holding a key item that is a longest-match with the key of the given record is set as a "Next Pointer".

When using a dictionary wherein this kind of a "Next Pointer" is set, a binary search is performed using a search key word and the key item in the record that is the search result is compared with the search key word and if there is non-coincidence, by successively traversing the Next Pointers, a longest-match search is enabled. This method utilizes the high speed of a binary search and enables a longest-match search. However the record numbers and next pointers have to be reset whenever a record is added or deleted.

Patent Document 1: Japanese Published Patent Application 2001-357070
Patent Document 2: Japanese Published Patent Application 2003-224581
Patent Document 3: Japanese Published Patent Application 1999-103318
Patent Document 4: Japanese Published Patent Application 1998-177582

SUMMARY OF THE INVENTION

In order to resolve the problems in the above-noted conventional art, in the Japanese patent application 2006-187827 the applicant proposed a bit string search (method) using a coupled node tree, which tree is a tree structure for bit string searches formed by a root node and a node pair stored in adjacent areas that is formed by a branch node and a leaf node, branch nodes, or leaf nodes; the root node showing the start point of the tree and being a leaf node if there is only one node in the tree and being a branch node if there are two or more nodes in the tree; the branch node including a discrimination bit position in the search key and information indicating a position of one node of a node pair of a link target; and the leaf node containing index keys that are the target bit strings of a bit string search.

The above cited patent application shows a method for creating a coupled node tree from a set of received index keys and basic search methods using a coupled node tree, such as methods for searching for a single index key from that coupled node tree, etc. The same application also explains that an index key set uniquely prescribes the configuration of a coupled node tree and the arrangement of the index keys in that tree is sorted.

Also the bit string searches may also include various kinds of search requests, such as requests to find a minimum value or maximum value or searches for a value within a given range, etc. Regarding this point, this applicant proposed methods, etc., of obtaining maximum/minimum values of index keys included in any arbitrary subtree of a coupled node tree in the Japanese patent application 2006-293619.

Furthermore, even if no index key exists that perfectly coincides with the bit string that was provided as a search key, search requests also exist for acquiring, as a search result, a key that has a part that coincides with the search key, if such a key exists. Thus this applicant has proposed a method for longest-match search and shortest-match search, using a coupled node tree, in the Japanese patent application 2007-132289.

Also, the above patent applications disclosed processing using a coupled node tree arranged in an array and during the search processing the array element numbers on the search path from the search start node are successively stacked and the array element numbers stacked in the search path stack are used in the processing.

The purpose of this invention is to utilize a coupled node tree known for the enablement of high speed searches and the low cost of data maintenance and, given the condition that the don't-care bits do not have a higher order position than the significant bits, to enable a search of a coupled node tree that includes index keys that express bit strings including don't-care bits, using a bit string that includes don't-care bits as the search key.

A coupled node tree with the data configuration below is provided in accordance with this invention and searches are performed using this coupled node tree. Also, methods for performing, with respect to that coupled node tree, inserts or deletes of leaf nodes that correspond to a specified bit string are provided in accordance with this invention.

The coupled node tree of this invention is a tree for bit string searches comprising a root node and a node pair, the node pair being a branch node and leaf node, or a pair of branch nodes, or a pair of leaf nodes located in adjacent storage areas.

The root node is the node that expresses the starting point of the tree and if there is one node in the tree it is a leaf node and if there are two or more nodes in the tree it is a branch node.

The branch node includes a discrimination bit position of a search key for a bit string search and position information indicating the position of a primary node, which is one node of a node pair that is the link target, and the leaf node includes an index key that is a bit string that is the target of a search.

Also, the index key comprises an encoded bit string encoding a significant bit prefixed bit string, which is either a bit string comprising only significant bits or a bit string comprising only don't-care bits (bits whose the value is insignificant) or a bit string comprising 1 or more significant bits to which 1 or more don't-care bits are suffixed.

The search key comprises an encoded bit string that is obtained by encoding a significant bit prefixed bit string.

The encoded bit string is a sequence of bit pairs corresponding to each bit configuring the significant bit prefixed bit string, and being a bit string comprising bit pairs with a distinguishing bit which expresses whether the bit is a don't-care bit or a significant bit and, if the bit is a don't-care bit, with a bit with a previously decided value, and, if the bit is a significant bit, with a data bit expressing the value of that bit.

There are cases when the significant bit prefixed bit string before encoding is called the original bit string, and the significant bit prefixed bit strings before encoding corresponding to the index key and the search key are called respectively the original index key and the original search key.

A search of this kind of coupled node tree is performed in the following way.

First, in the initial search step, with the root node of an arbitrary subtree of the coupled node tree as a search start node, links are made repeatedly and successively to a primary node of a node pair of the link target or a non-primary node that is a pair to that primary node, in accordance with a bit value of a search key at the discrimination bit position included in the branch node, until the leaf node is reached, while memorizing the path being traversed by at least memorizing address information of the branch nodes corresponding to the discrimination bit position at the position wherein exists a distinguishing bit in the encoded bit string.

Then in the index key acquiring step, an index key is acquired from the leaf node reached in the initial search step.

Continuing, in the difference bit position acquiring step, the bit strings of the index key and the search key are compared in the range from the head of the bit string until either the position of the bit pair that is encoded at the tail end of the significant bits of the index key acquired above or the position of the bit pair that is encoded at the first of the don't-care bits in the search key, whichever bit position which is closest to the head of the bit string, and the bit position of the highest-order differing bit value is acquired as the difference bit position.

Then, in the first longest matching key acquiring step, the index key acquired above is acquired as the longest matching key if the index key coincides with the search key within the above range.

The branch node selecting step selects the branch node with the discrimination bit position that is the bit position closest to the tail end of the encoded bit string, from among the branch nodes on the path wherein one of the positions of the distinguishing bits [that express a significant bit] in the encoded bit string corresponds to that node's discrimination bit position and its discrimination bit position is a bit position closer to the front of the encoded bit string than the difference bit position, if the result of the above comparison indicates that the index key acquired above and the search key do not coincide. Then, the second longest matching key acquiring step which acquires, as the longest matching key, from the node pairs linked to the branch node selected above, the index key of the terminal-side node, which is the leaf node that is linked to by a discrimination bit value that points to a distinguishing bit which expresses a don't-care bit.

Also, it is permitted that the index key in the leaf node may comprise a significant bit prefixed bit string before encoding rather than an encoded bit string.

In that case, in the first longest matching key acquiring step, the search key is compared with an encoded bit string that is obtained by encoding that index key rather than with the index key that is acquired.

Also, the following processing is done to insert in the coupled node tree a leaf node including an encoded index key that expresses the desired bit string which is specified by the format of either an already encoded bit string or a significant bit prefixed bit string.

First, if the desired bit string is specified as an encoded bit string, the specified encoded bit string is used as the search key and if the desire bit string is specified as a significant bit prefixed bit string, an encoded bit string that is obtained by encoding the specified significant bit prefixed bit string is acquired and the acquired encoded bit string is used as the search key.

Then, linking to a primary node of a node pair of the link target or a non-primary node that is a pair to that primary node is repeatedly and successively performed in accordance with a bit value of the search key at the discrimination bit position included in the branch node, from the root node until the leaf node is reached, while memorizing the path being traversed.

Continuing, a value comparison and a bit string comparison is performed between the index key of the leaf node and the search key.

Then, the position for inserting a node pair that includes the leaf node to be inserted and another node is determined by the relative positional relationship between the difference bit position, which is the highest order bit position that differs in the bit string comparison, and the discrimination bit position of a branch node on the path.

After that, a determination is made, by the value comparison, into which node of the node pair to be inserted the leaf node including the index key, which comprises the desired bit string, is to be inserted.

Also, it is permitted that the index key of the leaf node may be a significant bit prefixed bit string instead of an encoded bit string.

In that case, before performing the value comparison and the bit string comparison, an encoded bit string that is obtained by encoding that index key is acquired and instead of performing the value comparison and the bit string comparison between the index key of the leaf node and the search key, the value comparison and the bit string comparison is done between the obtained encoded bit string and the search key.

Also, to delete from the coupled node tree a leaf node including an encoded index key that expresses the desired bit string which is specified by the format of either an already encoded bit string or a significant bit prefixed bit string, the following processing is executed.

First, if the desired bit string is specified as an encoded bit string, the specified encoded bit string is used as the search key and if the desire bit string is specified as a significant bit prefixed bit string, an encoded bit string that is obtained by encoding the specified significant bit prefixed bit string is acquired and the acquired encoded bit string is used as the search key.

Then, linking to a primary node of a node pair of the link target or a non-primary node that is a pair to that primary node is repeatedly and successively performed in accordance with a bit value of the search key at the discrimination bit position included in the branch node, from the root node until the leaf node is reached.

Continuing, the contents of the node that is paired with that leaf node is stored in the branch node that is the link source of that node pair. Then, the node pair is deleted.

Also, the above search method, insert method, and delete method can also be provided in a program to be executed on a computer in accordance with this invention.

The value of the don't-care bits cannot be determined uniquely and the link target at a branch node cannot be determined uniquely based on bits whose value cannot be determine uniquely. Thus this invention uses search keys encoded as above.

Even the don't-care bit(s) in the significant bit prefixed bit string before encoding are encoded into bits that have a unique value as a search key with an encoded bit string, according to this invention. Also, regardless of whether the index keys included in leaf nodes are encoded bit strings or a significant bit prefixed bit strings before encoding, the discrimination bit position in the branch nodes expresses a bit position in an encoded status in this invention.

Thus, even if the don't-care bit(s) in the original significant bit prefixed bit string before encoding are included, a link target is uniquely determined in the branch node and searches are enabled according to this invention.

Also, in the search method of this invention the index key acquired as the longest matching key consistently expresses a set of bit strings encompassing the bit strings in which values are set in the don't-care bits regardless of whatever value is actually taken in the don't-care bit(s) in the original significant bit prefixed bit string before encoding of the search key.

Thus, the coupled node tree of this invention is preferable for searches using bit strings including don't-care bits.

Also, the coupled node tree of this invention can be generated with the above insert method and the coupled node tree of this invention can be maintained using the insert method and delete method.

Furthermore, the coupled node tree according to this invention is configured with node pairs, and is similar to the configuration of the coupled node tree in the previous patent application in the points of the branch node including a discrimination bit position and position information and of the leaf node including an index key. This configuration, which is similar to the coupled node tree in the previous patent application, is a configuration that is a contributing factor to the special features of the coupled node tree which enable fast searches and also enable low cost inserts and deletes.

Thus, while continuing to receive the advantages of fast searches and low computational cost for insert and delete of nodes, a coupled node tree that is preferable for searches of bit strings that include don't-care bits is provided in accordance with this invention.

DESCRIPTION OF THE PREFERRED EMBODIMENTS

First the coupled node tree premised in this invention and proposed by this applicant previously in the above cited application is described using a example of storing a coupled node tree in an array. Although it is possible to use address information in a storage device as the data indicating the position of a link target held by a branch node, by using an array formed by array elements that can store the larger of the occupied storage capacity area between a branch node and a leaf node, it is possible to express the node position as an array element number, enabling a reduction of the amount of position information.

Figure 2A:
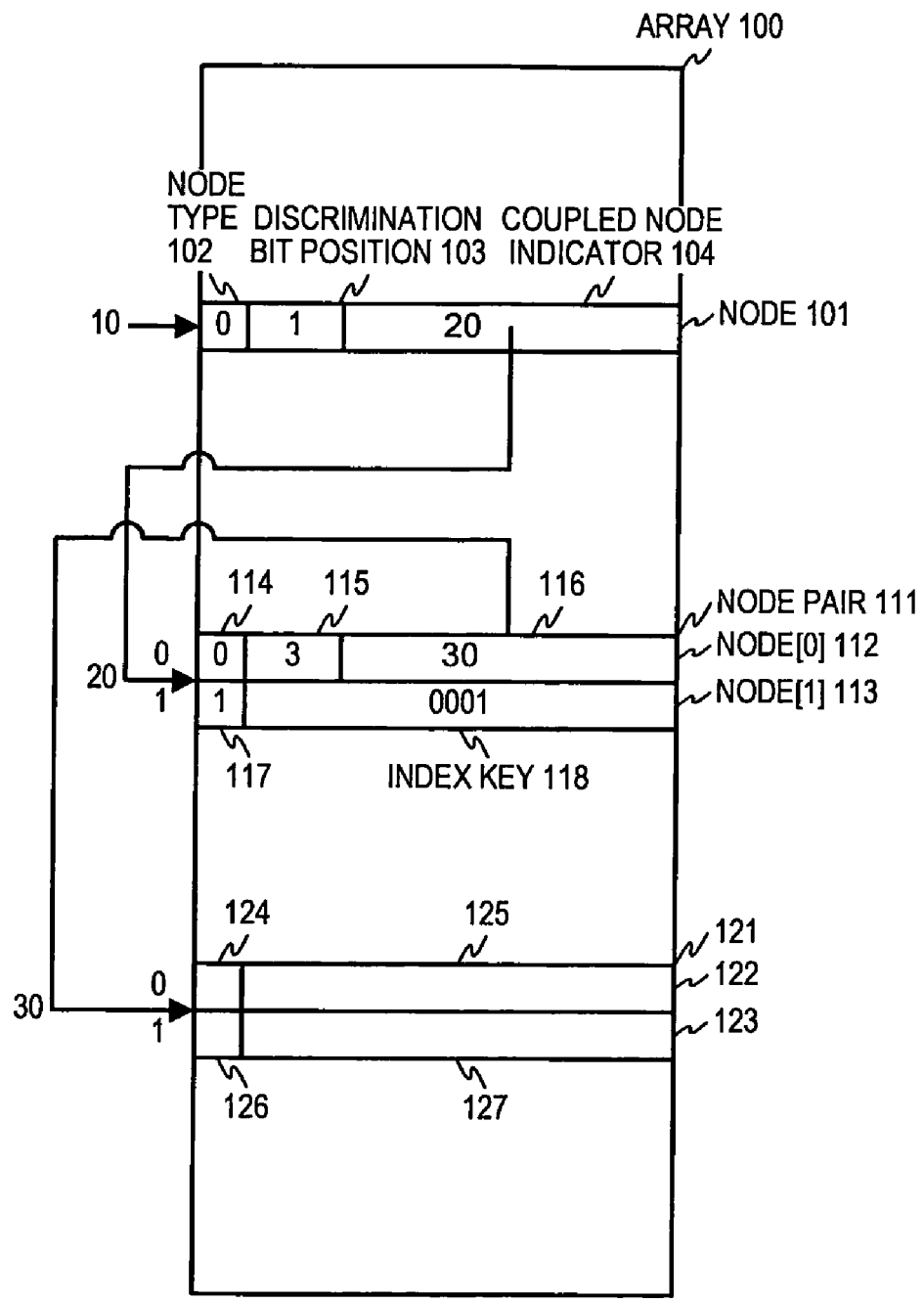
FIG. 2A is a drawing describing an exemplary configuration of a coupled node tree stored in an array.

FIG. 2A is a drawing that describes an exemplary configuration of a coupled node tree that is stored in an array.

Referring to FIG. 2A, a node 101 is located at the array element of the array 100 with the array element number 10. The node 101 is formed by a node type 102, a discrimination bit position 103, and a coupled node indicator 104. The node type 102 is 0, which indicates that the node 101 is a branch node. The value 1 is stored in the discrimination bit position 103. The coupled node indicator 104 has stored in it the array element number 20 of the primary node of the node pair of the link target. To simplify notation hereinafter, the array element number stored in a coupled node indicator is sometimes called the coupled node indicator. Also, the array element number stored in a coupled node indicator is sometimes expressed as the code appended to that node or the code attached to a node pair.

The array element having the array element number 20 has stored therein a node [0] 112, which is the primary node of the node pair 111. The secondary node [1] 113 forming a pair with the primary node is stored into the next, adjacent, array element (array element number 20+1). The value 0 is stored in the node type 114 of the node [0] 112, the value 3 is stored in the discrimination bit position 115, and the value 30 is stored in the coupled node indicator 116. The value 1 is stored in the node type 117 of the node [1] 113, thereby indicating that the node [1] 113 is a leaf node. The value "0001" is stored in the index key 118. In the same manner as in a Patricia tree described above, although information for accessing a record corresponding to an index key is of course included in a leaf node, this is omitted from the notation.

Primary nodes are indicated as the node [0], and secondary nodes that are paired therewith are indicated as the node [1]. Also the node stored in an array element with some array element number is called the node of that array element number and the array element number stored in the array element of that node is also called the array element number of the node.

The contents of the node pair 121 formed by the node 122 and the node 123 that are stored in the array elements having array element numbers 30 and 31 are not shown. The 0 or 1 that is appended to the node [0] 112, the node [1] 113, the node 122, and the node 123 indicates respectively to which node of the node pair linking is to be done when performing a search using a search key. Linking is done to the node having an array element number that is derived by adding the 0 or 1, which is the bit value of the search key at the discrimination bit position of the immediately previous branch node, to the coupled node indicator of the branch node.

Therefore, by adding the bit value of the discrimination bit position of the search key to the coupled node indicator of the immediately previous branch node, it is possible to determine the array element number of an array element storing a node at the link target.

Although in the above-noted example the smaller of the array element numbers at which the node pair is located is used as the coupled node indicator, it will be understood that it is also possible to use the larger of the array element numbers in the same manner.

Figure 1:
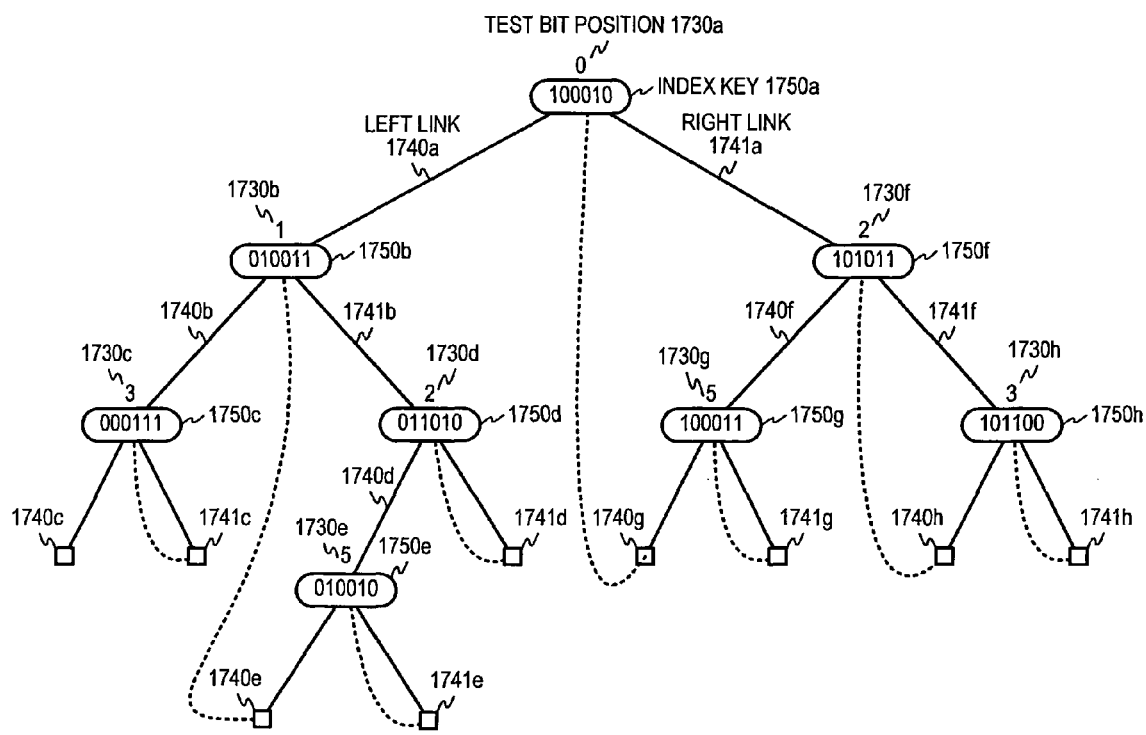
FIG. 1 is a drawing describing an example of a Patricia tree used in searching in the conventional art.
Figure 2B:
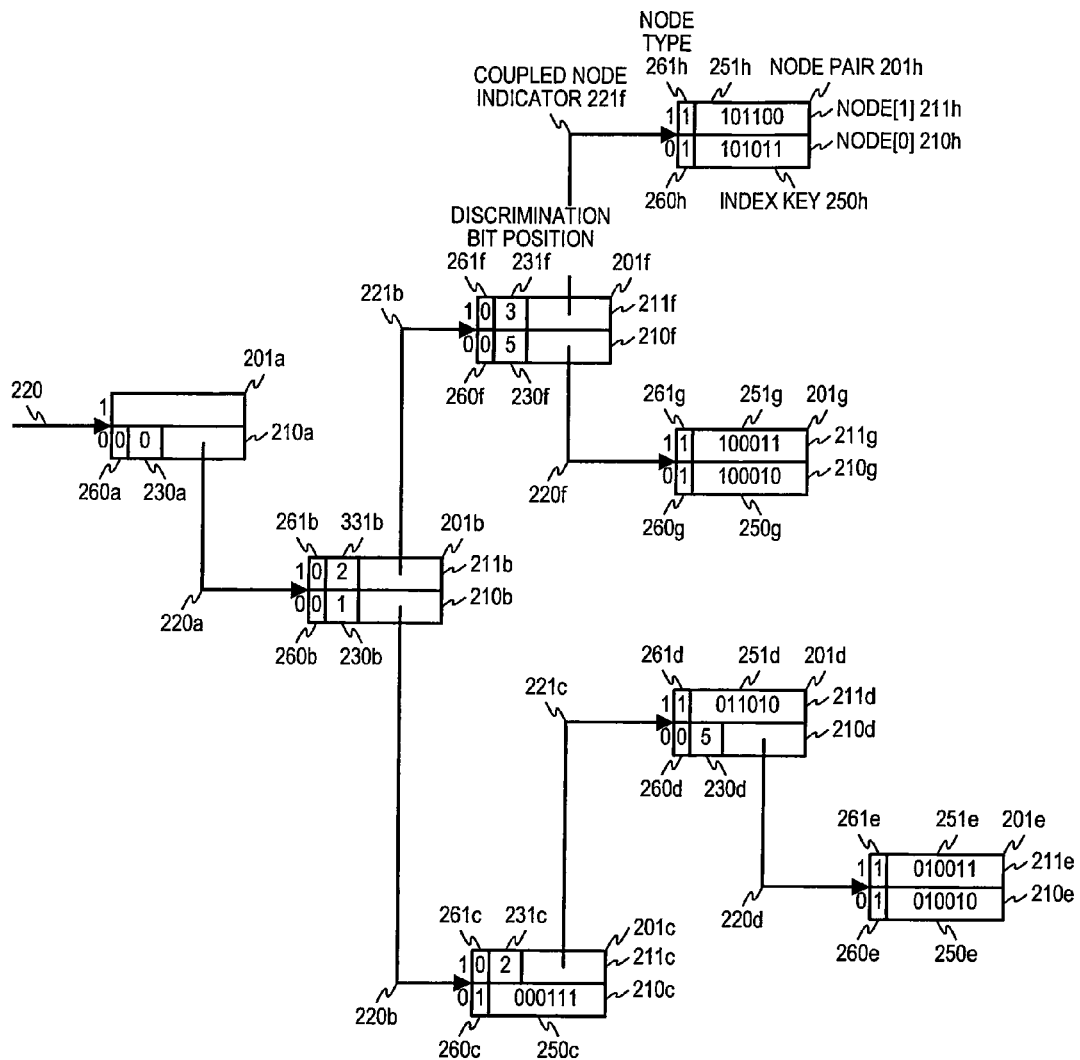
FIG. 2B is a drawing conceptually describing a tree structure of a coupled node tree.

FIG. 2B is a drawing that conceptually shows an embodiment of a tree structure of a coupled node tree. The 6-bit index keys that are illustrated are the same keys as those of the Patricia tree shown as an example in FIG. 1.

The reference numeral 210a shows the root node. In the example shown, the root node 210a is the primary node of the node pair 201a located at the array element number 220.

In this tree structure, a node pair 201b is located below the root node 210a, and below that are located the node pair 201c and the node pair 201f. Below the node pair 201f are located the node pair 201h and the node pair 201g. Below the node pair 201c is located the node pair 201d, and below the node pair 201d is located the node pair 201e.

The 0 or 1 code that is appended before each node is the same as the labels that are appended before the array element numbers described in FIG. 2A. The tree is traversed in accordance with the bit values at discrimination bit positions of the search key, so that the leaf node of the search for item is found.

In the example shown, the node type 260a of the root node 210a is 0, thereby indicating that this is a branch node, and the discrimination bit position 230a indicates 0. The coupled node indicator is 220a, which is the array element number of the array element in which the primary node 210b of the node pair 201b is stored.

The node pair 201b is formed by the node 210b and the node 211b, the node types 260b and 261b thereof both being 0, indicating branch nodes. The discrimination bit position 230b of the node 210b has 1 stored therein, and in the coupled node indicator of the link target is stored the array element number 220b of the array element in which is stored the primary node 210c of the node pair 201c.

Because 1 is stored in the node type 260c of the node 210c, this node is a leaf node, and thus includes an index key. "000111" is stored in the index key 250c. The node type 261c of the node 211c is 0, the discrimination bit position 231c of the node 211c is 2, and in the coupled node indicator is stored the array element number 221c of an array element in which is stored the primary node 210d of the node pair 201d.

The node type 260d of the node 210d is 0, the discrimination bit position 230d of the node 210d is 5, and in the coupled node indicator is stored the array element number 220d of an array element in which is stored the primary node 210e of the node 201e. The node type 261d of the node 211d that is paired with the node 210d is 1, and "011010" is stored in the index key 251d.

The node types 260e and 261e of the nodes 210e and 211e of the node pair 201e are both 1, indicating that both are leaf nodes. In the index keys 250e and 251e of each are stored "010010" and "010011" respectively as index keys.

The discrimination bit position 231b of the node 211b, which is the other node of the node pair 201b, has 2 stored therein, and the array element number 221b of the array element in which is stored the primary node 210f of the node pair 201f is stored in the coupled node indicator of the link target.

The node types 260f and 261f of the nodes 210f and 211f of the node pair 201f are both 0, indicating that both are branch nodes. In the discrimination bit positions 230f and 231f of each are stored 5 and 3, respectively. The array element number 220f of the array element in which is stored the primary node 210g of the node pair 201g is stored in the coupled node indicator of the node 210f, and the array element number 221f of an array element in which is stored the node [0] 210h, which is the primary node of the node pair 201h, is stored in the coupled node indicator of the node 211f.

The node types 260g and 261g of the nodes 210g and 211g of the node pair 201g are both 1, indicating that both are leaf nodes, and "100010" and "100011" are stored in the index keys 250g and 251g thereof, respectively.

In the same manner, the node types 260h and 261h of the node [0] 210h of the node pair 201h, and the node [1] 211h, which is paired therewith, are both 1, indicating that both are leaf nodes, and "101011" and "101100" are stored in the index keys 250h and 251h thereof, respectively.

The processing flow in searching for the index key "100010" from the above-noted tree is briefly described below. The discrimination bit positions are numbered 0, 1, 2, . . . and so on from the left.

First, processing is started from the root node 210a using the bit string "100010" as the search key. Because the discrimination bit position 230a of the root node 210a is 0, examining the bit value of the discrimination bit position 0 reveals 1. This being the case, 1 is added to the array element number 220a stored in the coupled node indicator and linking is done to the node 211b stored in the resulting array element number. Because 2 is stored in the discrimination bit position 231b of the node 211b, examination of the bit value of the discrimination bit position 2 reveals 0, resulting in linking to the node 210f stored in the array element having the array element number 221b stored in the coupled node indicator.

Because 5 is stored in the discrimination bit position 230f of the node 210f, and because examination of the bit value of the discrimination bit position 5 of the search key "100010" reveals 0, linking is done to the node 210g stored in the array element having the array element number 220f stored in the coupled node indicator.

Because the node type 260g of the node 210g is 1, indicating a leaf node, the index key 250g is read out and a comparison is performed with the search key, thereby revealing coincidence between the two, both of which are "100010". Searching is performed in this manner using the coupled node tree.

Next, the significance of the configuration of the coupled node tree will be described, with reference made to FIG. 2B.

The configuration of the coupled node tree is defined according to a set of index keys. In the example of FIG. 2B, the discrimination bit position of the root node 210a is 0 because there is an index key having a 0 at the 0th bit and an index key having a 1 at the 0th bit in the index keys shown in the embodiment example of FIG. 2B. The group of index keys having 0 at the 0th bit is classified under the node 210b, and the group of index keys having 1 at the 0th bit is classified under the node 211b.

That the discrimination bit position of the node 211b is 2 reflects a property of the index keys, this being that the 1st bits of all the nodes 211h, 210h, 211g, and 210g are the same value 0, a difference therebetween first occurring at the 2nd bit. Similar to the case of the 0th bit, the cases of the 2nd bit being 1 are classified on the node 211f side, and the cases of the 2nd bit being 0 are classified on the node 210f side.

Then because index keys having a 2nd bit that is 1 differ with regard to the 3rd bit, 3 is stored in the discrimination bit position of the node 211f, and because the 3rd and 4th bits of index keys having 0 as the 2nd bit are the same and differ at the 5th bit, 5 is stored in the discrimination bit position of the node 210f.

At the link target of the node 211f, because there is only one having a 3rd bit of 1 and one having a 3rd bit of 0, nodes 210h and 211h are leaf nodes, with "101011" and "101100" stored in the index keys 250h and 251h, respectively.

Even in the event that the index key set includes "101101" or "101110" in place of "101100", because there is equality with "101100" up until the 3rd bit, only the index key stored in the node 211h would change, there being no change in the structure of the tree itself. However, if "101101" is included in addition to "101100", the node 211h would become a branch node, the discrimination bit position thereof being 5. If the index key to be added is "101110", the discrimination bit position would be 4.

As described above, the coupled node tree structure is determined by the bit values of each bit position of the index keys included in the set of index keys.

To add to the above, because there is branching for each bit position having different bit values, meaning branching between a node that has a bit value of 1 at that position and a node that has a bit value of 0 at the same position, if the leaf nodes are traversed giving priority to the node [1] side and the tree depth direction, the index keys stored therewithin will be "101100" for the index key 251h of the node 211h, "101011" for the index key 250h of the node 210h, . . . , and "000111" for the index key 250c of the node 210c, these being sorted in descending order.

That is, in a coupled node tree the index keys are disposed in the tree in a sorted sequence. When searching using a search key, the index key is followed over a path disposed on a coupled node tree, and in the case, for example of a search key "101100" it is possible to reach the node 211h. As can be imagined from the above-noted description, even if the search key is made "101101" or "101110", the node 211h will be reached, and the index key "101100" will be obtained as the search result key.

Also, even in the case in which searching is done with "100100", in the link path of nodes 210a, 211b, and 210f, because the 3rd and 4th bits of the search key are not used and the 5th bit is 0, the node 210g will be reached, similar to the case searching with "100010." In this manner, the discrimination bit positions are used in accordance with bit makeup of the index keys stored in the coupled node tree to perform branching.

Figure 3:
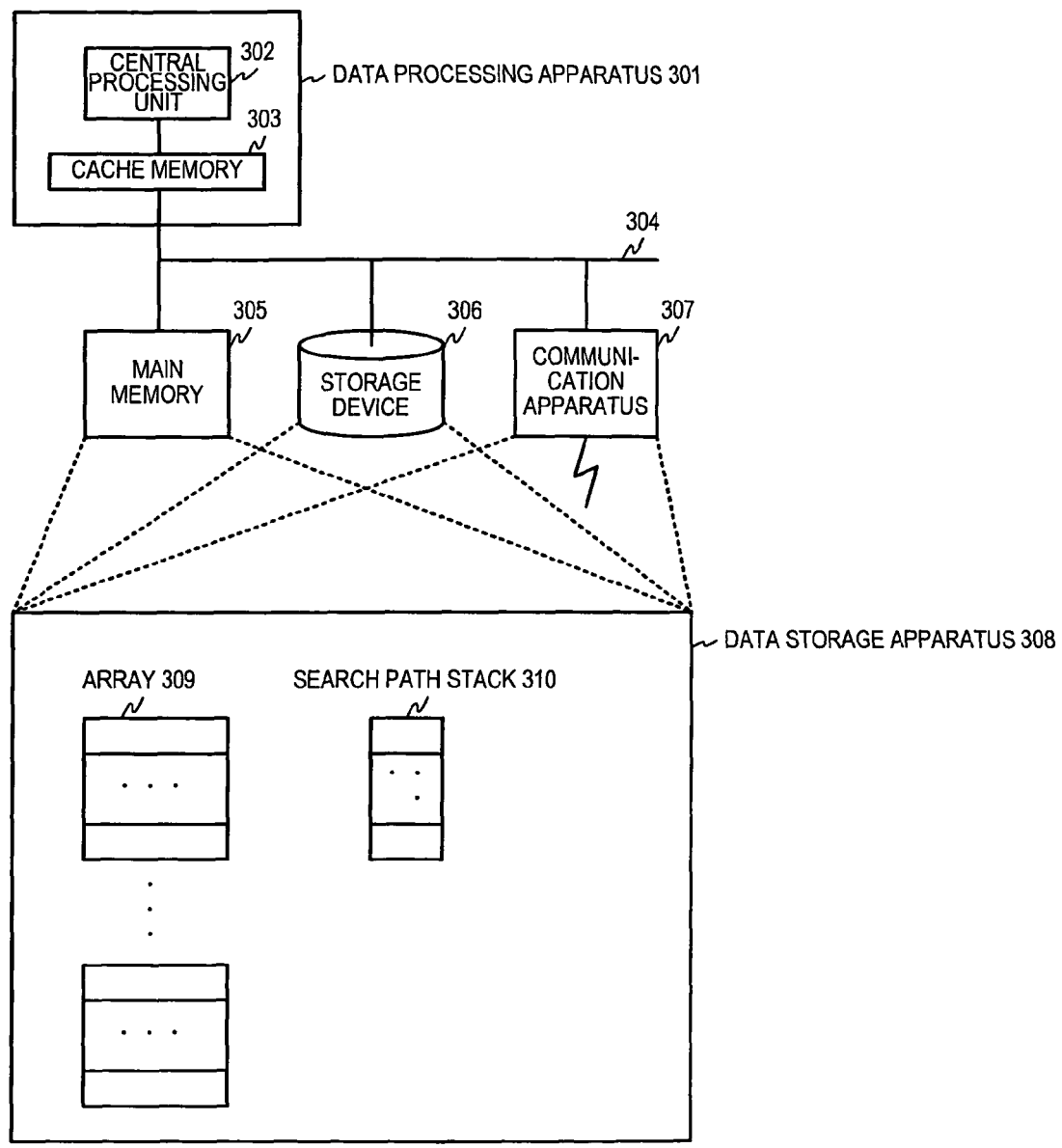
FIG. 3 is a drawing describing an exemplary hardware configuration for embodying the present invention.

FIG. 3 is a drawing describing an example of a hardware configuration for embodying the present invention. Search processing and data maintenance are implemented with the search apparatus of the present invention by a data processing apparatus 301 having at least a central processing unit 302 and a cache memory 303, and a data storage apparatus 308. The data storage apparatus 308, which has an array 309 into which is disposed a coupled node tree, and a search path stack 310, into which are stored array element numbers of nodes which are traversed during the search, can be implemented by a main memory 305 or a storage device 306, or alternatively, by using a remotely disposed apparatus connected via a communication apparatus 307. The array 100 in FIG. 2A is one embodiment of the array 309.

In the example shown in FIG. 3, although the main memory 305, the storage device 306, and the communication apparatus 307 are connected to the data processing apparatus 301 by a single bus 304, there is no restriction to this connection method. The main memory 305 can be disposed within the data processing apparatus 301, and can be implemented as hardware within the central processing unit 302. It will be understood that it is alternatively possible to select appropriate hardware elements in accordance with the usable hardware environment and the size of the index key set, for example, having the array 309 held in the storage device 306 and having the search path stack 310 held in the main memory 305.

Also, although it is not particularly illustrated, a temporary memory area can of course be used to enable various values obtained during processing to be used in subsequent processing.

Next, the basic search processing using the coupled node tree proposed by this applicant in the previously cited patent application will be introduced to the extent necessary to understand this invention.

Figure 4:
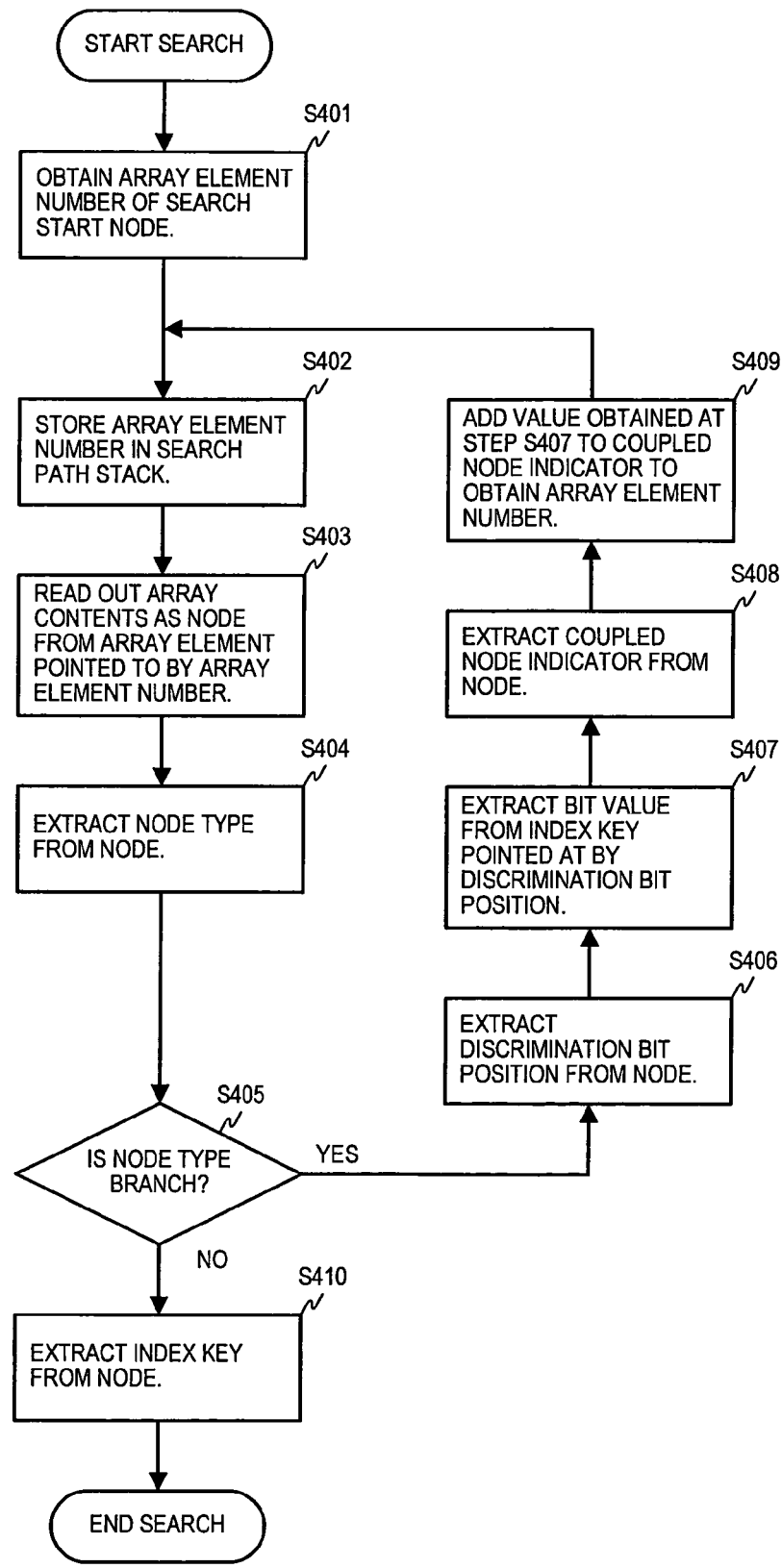
FIG. 4 is a flowchart showing the search processing in an embodiment of the present invention.

FIG. 4 is a flowchart showing a basic operation for search processing which is proposed by this applicant in the above cited Japanese patent application 2006-293619.

First, in step S401 the array element number of the search start node is acquired. The search start node can be any node configuring the coupled node tree and it is stored in the array element that corresponds to the acquired array element number. How the search start node is specified will be described later in the descriptions of the various search applications.

Next, at step S402, the array element number acquired is stored on the search path stack 310. Proceeding to step S403, the array element of the array element number is read out as a node to be referenced. At step S404, the node type is extracted from the read out node. Next at step S405, a determination is made as to whether the node type is a branch node or not. If the determination made at step S405 is that the node type is a branch node, processing proceeds to step S406. At step S406, the discrimination bit position is extracted from the node. Next, at step S407, the bit value of the search key at the discrimination bit position extracted at step S406 is obtained.

Next, proceeding to step S408, the coupled node indicator is extracted from the node. Then, proceeding to step S409, the bit value obtained at step S407 is added to the coupled node indicator obtained at step S408, thereby obtaining the array element number of the link target node, and return is made to step S402.

Thereafter, the processing from step S402 to step S409 is repeated until the determination at step S405 is that the node is a leaf node and processing proceeds to step S410. At step S410, the index key is extracted from the leaf node, and processing ends.

Also, by repeating the process of inserting leaf nodes, the generation of a coupled node tree is enabled. In accordance with the above Japanese patent application 2006-187827, in that insert processing, first, the pertinent leaf node is searched for in the coupled node tree with the specified insert key as the search key. Doing that search, the array element numbers of the array elements in which are stored the branch nodes on the path traversed up to the leaf node and the pertinent leaf node are successively stored in a stack. Then, a value comparison and a bit string comparison are performed between the search key and the index key included in the leaf node. Continuing, the position for insertion of a new node pair that includes a leaf node including the index key to be inserted and the other node is determined by the relative positional relationship between the highest order bit position that differs in the bit string comparison, and the discrimination bit position of a branch node in the stack. Then, the value relationship determines which node of the node pair should hold the leaf node including the index key, and the node pair is inserted.

Also, the method for deleting from a coupled node tree a leaf node including a specified index key is also recited in the above Japanese patent application 2006-187827. In accordance with this, the pertinent leaf node is searched for in the coupled node tree with the specified delete key as the search key, and the contents of the node that configures the node pair for that leaf node is written into the branch node that is the link source for that node pair, and by deleting that node pair the leaf node that includes the specified index key can be deleted.

Also, the Japanese patent application 2006-293619 also recites a prefix search method that extracts all index keys whose value in the range from 0th bit to nth bit completely coincides with the value of the prefix match key that specifies that range from 0th bit to nth bit (n being equal to or larger than 0). For example, if "10****" is specified as the prefix match key, then n equals "1" and all index keys whose 0th bit and first bit coincide with the prefix match key are extracted.

The specific method is as follows. First, a lower limit key for which all the "*" in the prefix match key have been replaced with a "0" and an upper limit key for which all the "*" in the prefix match key have been replaced with a "1" are obtained. Then, the index keys in the search ranged specified by the lower limit key and the upper limit key are extracted from the coupled node tree in ascending sequence.

The process of extracting the index keys from the coupled node tree in the specified search range in ascending sequence is performed in the following way. First, using the lower limit key, the lower limit value, which is the minimum value of the index keys which are equal to or larger than the lower limit key, is extracted, and using the upper limit key, the upper limit value, which is the maximum value of the index keys which are equal to or less than the upper limit key, is extracted.

The lower limit value is acquired by searching for a leaf node in the coupled node tree in a prioritized search sequence that searches prioritizing the node [0] side and the depth direction and then comparing the index key of the leaf node with the lower limit key. The upper limit value is acquired in the same way as acquiring the lower limit value with the exception that the prioritized search sequence searches prioritizing the node [1] side and the depth direction.

Then, starting from the leaf node holding the index key with the lower limit value, the index keys are successively extracted from the leaf nodes by searching for a leaf node in the coupled node tree in a prioritized search sequence that searches prioritizing the node [0] side and the depth direction until the index key with the upper limit value is found.

By means of the above processing, all index keys whose value completely coincides with the value of the prefix match key in the range from 0th bit to nth bit can be extracted.

Also, the Japanese patent application 2007-132289 recites a longest-match search method that searches for an index key whose difference bit position is the lowest order of all the index keys that partially match the specified longest-match search key. Also, the difference bit position here is the position of the bit value with the highest order position of all the non-matching bits that do not match when comparing the two bit strings.

The specific method is as follows. First, using the longest-match search key as the search key, the search of FIG. 4 is performed with the root node as the search start node, and the index key obtained as that result is compared with the longest-match search key to determine a difference bit position.

Then, tracing back up the search path stack stored during the search of FIG. 4, the node whose array element number is stored in the search path stack immediately after the array element number of the branch node with the lowest order discrimination bit position of all the branch nodes whose discrimination bit position is of a higher order than the difference bit position is acquired as the longest-match node.

Given the configuration of a coupled node tree, all the index keys included in the subtree whose root node is the longest-match node acquired in the above way satisfy the above condition that their difference bit position be the lowest order of the index keys that partially match the longest-match search key. Thus, it is sufficient to read out, as necessary, an appropriate index key from this subtree.

The above described the art that is prerequisite to this invention, but if necessary, the detailed specifications and drawings recited in the above patent applications may be referenced.

Also, if the relationship between the prefix match search according to the above patent application 2006-293619 and the longest-match search according to the above patent application 2007-132289, and the search according to this invention were to be explained, it would be as follows.

The prefix match search key used in the above prefix match search includes don't-care bits. Also, from the point that the above longest-match search may obtain index keys that match the longest-match search key only partially, it can be perceived as handling the range of non-matching bits as don't-care bits.

However, neither the above prefix match search nor the above longest-match search are processes to acquire a single uniquely determined index key. In other words, the number of index keys read out in the above prefix match search is two or more. Also, in the above longest-match search, the subtree with the longest-match node as its root node may have multiple leaf nodes and any index key can be freely read out from this subtree.

That is, both the above prefix match search and the above longest-match search result in multiple equivalent index keys that satisfy the search conditions. Thus, depending on the purpose of the search, it is necessary to select one out those multiple index keys based on some criterion.

On the other hand, in areas that demand very high speed processing such as searches of routing tables in routers and so forth, it is not good to have the above two-level processing of searching and selecting. For that reason, even in a search based on partial matches such as a prefix match search or a longest-match search, it is preferable to have a method that determines uniquely a single most appropriate index key without the second stage of selection processing and acquires that unique index key.

As described below, a search that takes in account don't-care bits in accordance with this invention satisfies that kind of a demand. The above prefix match search, the above longest-match search, and the search that takes in account don't-care bits described below should be separately chosen depending on the purpose of the search.

Next, a preferred embodiment of this invention is explained in detail. Below, after describing an example of a bit string encoding method and an example of a coupled node tree, the various processes of searching, inserting, and deleting are described.

In the description below, the bit string before encoding and the bit string after encoding are called "the original bit string" and "the encoded bit string" respectively. The words "index key" and "search key" express a status of being an encoded bit string unless this status is specifically denied, and if the status of the original bit string is to be expressed, it is expressed with "the original index key" or "the original search key".

Also, bits whose value is fixed as either a "0" or a "1" are called "significant bits" and bits whose value is not fixed uniquely and can be either a "0" or a "1" are called "don't-care bits." Also, to distinguish don't-care bits from significant bits, they are expressed with the symbol "*".

Also, it is presumed below that don't-care bits do not precede significant bits. In other words, the original bit string comprises only don't-care bits or only significant bits or 1 or more significant bits followed by 1 or more don't-care bits.

In order to encode such an original bit string which may include don't-care bits, an encoding method is used that encodes each bit with 2 bits.

The encode bit string is taken to have units of 2-bit bit pairs. The bit 0 of each bit pair is the "distinguishing bit" that expresses whether the bit is a don't-care bit or a significant bit.

The bit 1 of each bit pair is called the "data bit." When the value of the distinguishing bit is "0" it expresses a don't care bit and when it is "1" it expresses a significant bit.

When the value of the distinguishing bit is "0" the value of the data bit paired with it is always a previously determined value, and in the preferred embodiment below the previous determined value of "0" is used. When the value of the distinguishing bit is "1" the value of the data bit is the value of the bit in the original bit string.

Stated differently, when a given bit in the original bit string is a significant bit and its value is "0" it is encoded as "10" and when a given bit is a significant bit and its value is "1" it is encoded as "11" and when a given bit is a don't-care bit it is encoded as "00".

In accordance with this encoding method, whether subsequent significant bits exist in the original string or not can be easily determined from the encoded bit string. The reason for this is that any arbitrary bit in the encoded bit string can be distinguished as to whether it is a distinguishing bit or a data bit by whether the bit position is an even number or an odd number, and that don't-care bits do not precede significant bits in line with the above presupposition.

Figure 5:
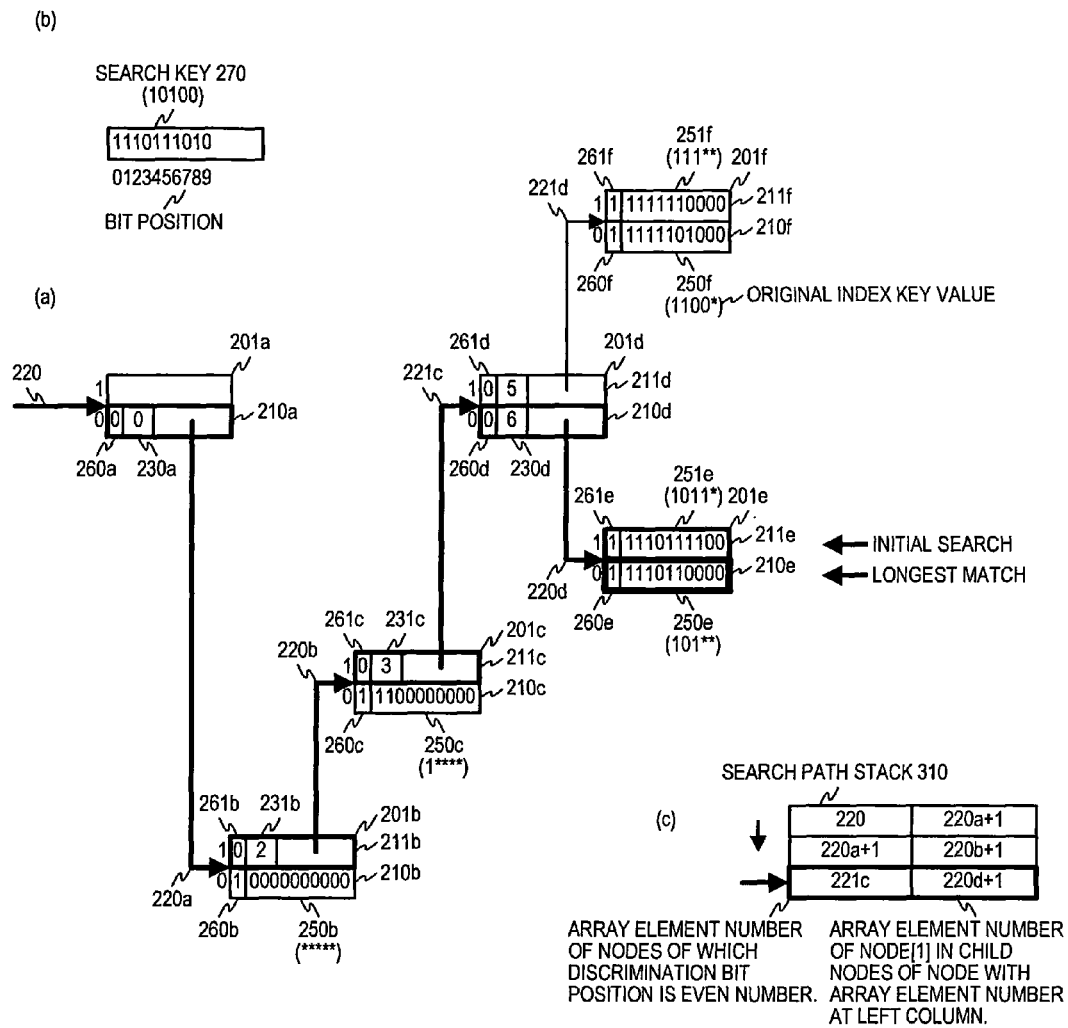
FIG. 5 is a drawing conceptually describing a tree structure of a coupled node tree using encoded bit strings.

Next, referencing FIG. 5, an example of a coupled node tree using encoded bit strings is described. FIG. 5 (*a*) shows a conceptual configuration of a coupled node tree corresponding to the set of six un-encoded original index keys "***", "1", "101", "1011", "1100*", and "111**".

Also, FIG. 5 includes the parts (b) and (c) related to a description of the search processing provided below, but here a description of the configuration of a coupled node tree is first presented.

Each leaf in the coupled node tree in FIG. 5 (*a*) contains an encoded bit string that is obtained by encoding one of the above 6 original index keys as an index key. In order to facilitate understanding, FIG. 5 shows the value of the original index key enclosed nearby in parentheses.

Since, except for the fact that an encoded bit string is stored in the index key, FIG. 5 is just like FIG. 2B, the same labels as FIG. 2B are also used in FIG. 5. I.e., the root node 210*a* is arranged in array element number 220 and is the primary node of node pair 201*a*.

For the tree configuration, node pair 201*b* is arranged below the root node 210*a*, and in the level below is arranged node pair 201*c*, then in the level below that is arranged node pair 201*d*. Then, in the level below node pair 201*d* is arranged node pair 201*e* and node pair 201*f*.

Node type 260*a* of the root node 210*a* is 0 and expresses that the it is a branch node, and the discrimination bit position 230*a* is 0, and in its coupled node indicator is stored the array element number 220*a* of the array element holding node 210*b* which is the primary node of node pair 201*b*.

Node pair 201*b* is configured of node 210*b* that has the node type 260*b* of "1" and is a leaf node and of node 211*b* that has the node type 261*b* of "0" and is a branch node.

In the index key 250*b* of node 210*b* is stored "0000000000" that is obtained by encoding the original index key "***". Furthermore, 2 is stored in the discrimination bit position 231***b* of node 211*b*, and the array element number 221*b* of the array element which holds the primary node 210*c* of the node pair 201*c* is stored in its coupled node indicator.

Node pair 201*c* is configured of node 210*c* that has the node type 260*c* of "1" and is a leaf node and of node 211*c* that has the node type 261*c* of "0" and is a branch node.

In the index key 250*c* of node 210*c* is stored "1100000000" that is obtained by encoding the original index key "1**". Furthermore, 3 is stored in the discrimination bit position 231***c* of node 211*c*, and the array element number 221*c* of the array element which holds the primary node 210*d* of the node pair 201*d* is stored in its coupled node indicator.

Node pair 201*d* is configured of node 210*d* and 211*d*, and their nodes types 260*d* and 261*d* respectively are "0" which expresses a branch node. In the discrimination bit position 231*c* of node 211*c* is stored 6, and the array element number 220*d* of the array element which holds the primary node 210*e* of the node pair 201*e* is stored in its coupled node indicator.

Furthermore, 5 is stored in the discrimination bit position 231*d* of node 211*d*, and the array element number 221*d* of the array element which holds the primary node 210*f* of the node pair 201*f* is stored in its coupled node indicator.

Node pair 201*e* is configured of node 210*e* and 211*e*, and their nodes types 260*e* and 261*e* respectively are "1" which expresses a leaf node. In the index key 250*e* of node 210*e* is stored "1110110000" that is obtained by encoding the original index key "101**".

Also, in the index key 251*e* of node 211*e* is stored "1110111100" that is obtained by encoding the original index key "1011*".

Node pair 201*f* is configured of node 210*f* and 211*f*, and their nodes types 260*f* and 261*f* respectively are "1" which expresses a leaf node. In the index key 250f of node 210f is stored "1111101000" which encodes the original index key "1100*".

Also, in the index key 251f of node 211f is stored "1111110000" that is obtained by encoding the original index key "111**".

If the encoded bit string used as the search key perfectly coincides with one of the index keys included in the coupled node tree, the index key that identical to the search key is obtained as the search result by processing just like that of FIG. 4.

However, when taking consideration of don't-care bits, there are cases where the search result should be an index key that partially coincides with the search key. Details of a search based such a partial coincidence is described below, referencing FIG. 6 to FIG. 11.

Next, the meaning of the configuration of the coupled node tree in FIG. 5 (a) is described. Even in cases using an encoded bit string like FIG. 5 (a), the configuration of the coupled node tree is prescribed by the set of index keys just as in FIG. 2B.

In the example of FIG. 5 (a) the reason that the discrimination bit position of the root node 210a is "0" is that there is 0 at the 0th bit of an index key and 1 at the 0th bit of an index key in FIG. 5. Since only one of the index keys has a 0 in bit 0, it is classified to node 210b, and the index keys with a 1 in bit 0 are classified to levels under node 211b.

The fact that the discrimination bit position 231b of node 211b is 2 reflects the characteristic of the set of index keys wherein those index keys with a 1 in bit 0 stored in each node under node 211b all are identical in having a 1 in bit 1 and they start differing from bit 2.

Below, in the same way, of the index keys whose 0th and 1st bit are "11", since only one index key has a 0 at the 2nd bit it is classified to node 210c, and those with 1 in the 2nd bit are classified to the levels under 211c. The fact that the discrimination bit position 231 of node 211c is 3 reflects the fact that the index keys stored in each of the nodes in the level under node 211c include those with a 0 in the 3rd bit and those with a 1.

The reason why the discrimination bit position 230d of node 210d is 6 reflects the characteristic of the index keys stored in each of the nodes in the levels under node 210d such that the index keys have "1110" in the 0th to 3rd bit, and that all are identical in that the 4th and 5th bits are "11", and that they start to differ in the 6th bit.

In the link targets of node 210d there are just one each of index keys with a 1 and a 0 in the 6th bit. Thus, nodes 210e and 211e are leaf nodes, and the encoded bit string "1110110000" for "101**" and the encoded bit string "1110111100" for "1011*" are stored in the index keys 250e and 251e of nodes node 210e and 211e respectively.

Also, the reason why the discrimination bit position 231d of node 211d is 5 reflects the characteristic of the index keys stored in each of the nodes in the levels under node 211d such that the index keys have "1111" in the 0th to 3rd bit, and that all are identical in that the 4th bit is "1", and that they start to differ in the 5th bit.

In the link targets of node 211d there are just one each of index keys with a 1 and a 0 in the 5th bit. Thus, nodes 210f and 211f are leaf nodes, and the encoded bit string "1111101000" for "1100*" and the encoded bit string "1111110000" for "111**" are stored in the index keys 250f and 251f of nodes node 210f and 211f respectively.

In this way, the set of index keys that are encoded bit strings in FIG. 5 (a) accommodate the tree configuration of a coupled node tree.

Also, in the encoding method of this preferred embodiment, that 2 original bit strings coincide in bits 0 to m (m greater than or equal to 0) and that 2 encoded bit strings that are obtained by encoding those original bits string coincide in bits 0 to 2m+1 is equivalent. Thus, the configuration of a coupled node tree can also be said to be prescribed by the set of original index keys before encoding, and a correspondence relationship exists between the tree configuration and the set of original index keys.

That is to say, since, of the original index keys, those whose bit 0 is a don't-care bit are seen to be "***", "***" is classified to node 210b directly under the root node 210a, and original index keys whose bit 0 is a significant bit are classified to the levels under node 211b which is paired with node 210b.

The original index keys classified to the levels under node 211b all are identical in having a 1 in bit 0. Thus it is unnecessary to classify by whether bit 0 is a 0 or a 1.

Also, since, of these original index keys, only the original index key "1****" has a 1st bit which is a don't-care bit, it is classified to node 210c, and original index keys whose 1st bit is a significant bit are classified to the levels under node 211c which is paired with node 210c.

Among the original index keys with at least the 0th and 1st bits as significant bits, there are those with a 0 in the 1st bit and those with a 1. Whereat, those whose 0th and 1st bits are "10" are classified to the levels under node 210d and those whose 0th and 1st bits are "11" are classified to the levels under node 211d.

There are two original index keys, "101**" and "1011*", classified to the levels under node 210d. These two original index keys coincide completely from the 0th bit to the 2nd bit but differ as to whether the 3rd bit is a don't-care bit or a significant bit:

In this preferred embodiment, the don't-care bits "*" are encoded as "00". Thus, in this way, if original index keys whose n-th bit and after (n equal to or greater than 1) are don't-care bits and original index keys whose n-th bit is a significant bit coincide completely in the range of the 0th to the (n-th)−1, the former are classified to the node [0] side.

Thus, the original index key "101**" is classified to node 210e and "1011*" is classified to 211e respectively.

On the other hand, there are two original index keys, "1100*" and "111**", classified to the levels under node 211d. These two original index keys coincide completely from the 0th bit to the 1st bit but differ as to the 3rd bit.

If while comparing sequentially from the highest order bit 0, a significant bit with a different value is discovered before a don't care bit is encountered in either of the original index keys, the original index key whose significant bit is "0" is classified to the node [0] side and the original index key whose significant bit is "1" is classified to the node [1] side.

Thus, the original index key "1100*" is classified to node 210f and the original index key "111**" to node 211f respectively.

As described above, the hierarchical configuration obtained by classifying the encoded bit strings is equivalent to the hierarchical configuration obtained by classifying the original bit strings.

Also, since the value of the don't-care bits is indeterminate, in normal conditions it cannot be determined whether the value of the don't-care bits or that of the significant bits is larger than the other. However, for descriptive purposes, if it is defined that the "*" of don't-care bits is smaller than the value "0" of significant bits, it can be said that the configuration of a coupled node tree reflects the sequential character of the original index keys.

That is to say, in the coupled node tree of FIG. 5 too, just as in FIG. 2B, the original index keys expressed by the index keys stored in leaf nodes reached by traversing the tree, while prioritizing the node [1] side and the depth direction, are sorted in descending order. In other words, the index keys are disposed in the coupled node tree in sequence corresponding to sorted descending order of the original index keys.

Also, In this preferred embodiment, the value of distinguishing bits expressing don't-care bits is made "0" in order to accommodate the above definition wherein "*" is smaller than "0".

Figure 6:
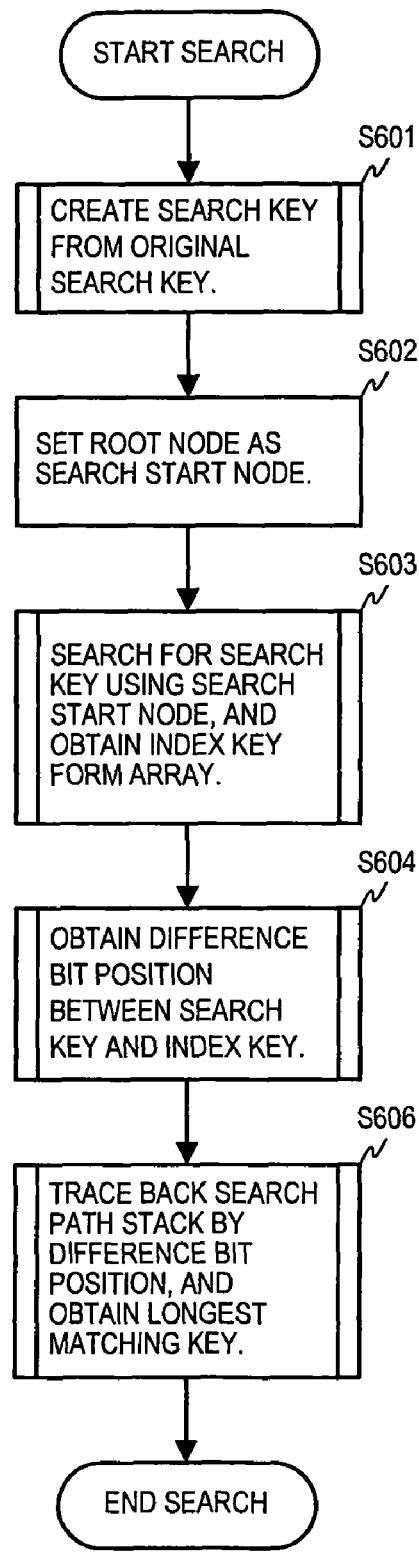
FIG. 6 is a flowchart showing the search processing in an embodiment of the present invention.

Next, the search processing in one preferred embodiment of this invention is described referencing the flowchart of FIG. 6. In the search processing of FIG. 6, the original search key, which is an un-encoded original search key, is specified as input, and, for example, a coupled node tree using encoded bit strings like those in FIG. 5 is searched.

The search processing of FIG. 6 is processing to obtain the longest matching key if an index key exists in the coupled node tree that satisfies the condition of being the "longest matching key" as described below. If no index key exists in the coupled node tree that satisfies the condition of being the "longest matching key", the search fails and is terminated.

In this preferred embodiment, the longest matching key expressed an index key corresponding to either of (a) or (b) below.

(a) an index key that is completely identical to the encode bit string that is obtained by encoding the original search key.

(b) an index key that either has no significant bits or has a number of significant bits less than that of the original search key but whose number of significant bits is the largest of all original index keys for whom the value of all their significant bits coincide with the original search key.

Also, the above (a) has a higher priority than (b). That is to say, if an index key corresponding to (a) exists, it is the longest matching key and, then, even if an index key corresponding to (b) were to exist, it is not the longest matching key.

Before a detailed description of FIG. 6 is started, several examples of the above (a) and (b) are described.

An example of the above (a) is, in the coupled node tree of FIG. 5 (*a*), the encoded bit string of the index key 250*f* in node 210*f* that is obtained by encoding "1100*", when the original search key is "1100*".

Also, when citing examples of longest matching keys corresponding to the above (b) in the coupled node tree of FIG. 5 (*a*), they are the following.

The first example is an example of the case where the original search key is "11001". The number of significant bits in this original search key is 5.

In FIG. 5 (*a*) there is an original index key "***" which has no significant bits. Also, there are the index keys "1**" and "1100*" whose number of significant bit is less than 5 and for which the value of their significant bits coincides with that of the original search key.

Of these 3 original index keys, the longest matching key is the index key 250*f* of node 210*f*, being obtained by encoding "1100*", which has the largest number of significant bits.

The second example is an example of the case where the original search key is "11***". The number of significant bits in this original search key is 2.

In FIG. 5 (*a*) there is an original index key "***" which has no significant bits. Also, there is the index key "1**" whose number of significant bit is less than 2 and for which the value of its significant bits coincides with that of the original search key.

Of these two original index keys, the longest matching key is the index key 250*c* of node 210*c*, being obtained by encoding "1****", which has the largest number of significant bits.

Also, index keys 250*f* and 251*f* that is obtained by encoding the original index keys "1100*" and "111" also exist in the coupled node tree. The range coinciding with "11*" seems at first glance to be wider for "1100*" and "111" than for "1**".

However, index keys 250*f* and 251*f* do not fall within the definition of a longest matching key. The description below may help clarify why the longest matching key is defined in this way.

Since the don't-care bits express arbitrary values, an original bit string that includes don't-care bits can be seen as expressing a set of bit strings. For example, the set that expresses "11***" encompasses the original bit string "11011" and others.

However, "11011" differs from "1100*" at the third bit and with "111**" at the second bit. In other words, "11011" is not encompassed in "1100*" or "111". Thus, the index keys 250***f* and 251*f* are unsuitable to be the longest matching key for the original search key "11***".

Conversely, regardless of the values of the don't-care bits for the original search key "11*", bit strings that have values set in the don't-care bits are always encompassed by the set expressing the original index key "*" and the set expressing the original index key "1**".

Then, of the two original index keys, the set expressed by the original index key "1**", which has more significant bits, is smaller and is closer to the set expressed by the original search key "11*". Thus, the longest matching key corresponding to the original search key "11*" is the original index key "1**".

The third example is an example of the case wherein the original search key is "0****". In the coupled node tree of FIG. 5 (*a*) no index key exists that is obtained by encoding an original index key starting with a "0".

However, in this case, the index key 250*b* of node 210*b*, whose encoded bit string that is obtained by encoding the original index key "***", is the longest matching key in accordance with the above definition (b). Actually, regardless of the values in the don't-care bits in the original search key "0", bit strings that have values set in the don't-care bits are always encompassed by the set expressing the original index key "***".

The acquisition of a longest matching key as defined above is optimal for selection of the most appropriate classification in cases where the value of a bit string should correspond to a hierarchical classification of the contents that express bit strings, for example that of IP addresses.

Next, referencing the flowchart of FIG. 6, the processing of FIG. 6 is described in detail. If the longest matching key as defined in the above (a) and (b) exists it is obtained by the processing shown in FIG. 6 and if it does not exist the result obtained is that of a search failure.

In step S601, a search key is created from the specified original search key by means of the above encoding method. Details of step S601 are explained below referencing FIG. 7. For example, FIG. 5 (*b*) gives an illustrative example of a 10-bit search key 270 created from a 5-bit original search key "10100".

Continuing, in step S602, the root node of the coupled node tree that is the target of the search is set in the search start node.

Then, in step S603, the array holding the nodes of the coupled node tree is searched from the search start node using the search key, and an index key is obtained as the result of the search. The details of the processing in step S603 will be explained later along with FIG. 8. In order to enable a later reference in step S606, in step S603, the array element number is stored in search path stack 310, as exemplified in FIG. 5(c).

In the following step S604, the difference bit position between the search key and the index key obtained in step S603 is obtained. The definition of a difference bit position and the details of step S604 will be described hereinafter along with FIG. 9 and FIG. 10.

Continuing, in step S606, the search path stack is traced back based on the search key and the index key obtained in step S603, and the longest matching key is obtained. Details of the processing of step S606 are explained below in line with FIG. 11.

In step S606, if the longest matching key has obtained, the search is successful, and the processing of FIG. 6 is terminated. In step S606, if the longest matching key has not obtained, the search fails and the processing of FIG. 6 is terminated.

Figure 7:
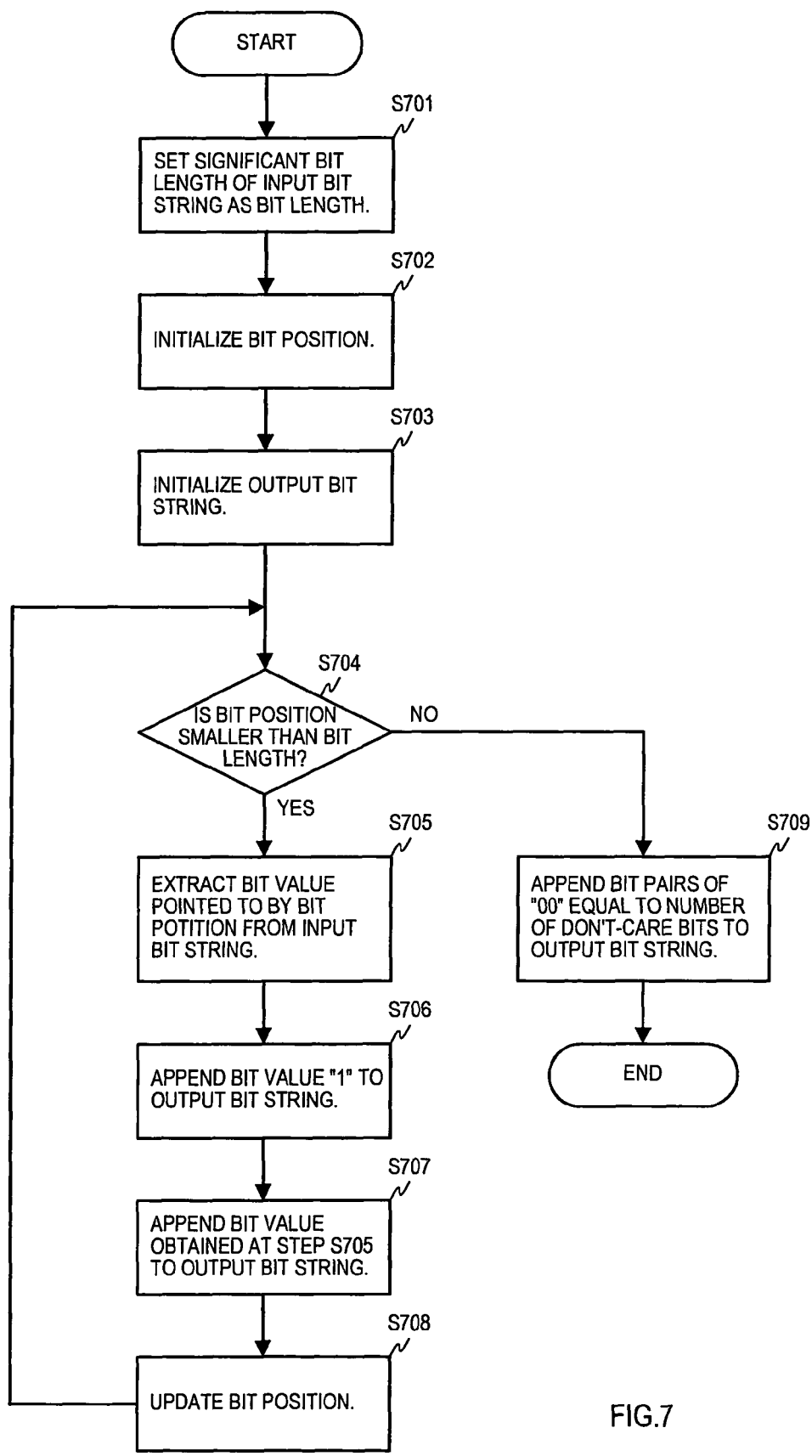
FIG. 7 is a flowchart showing the encode processing in an embodiment of the present invention.

Next, referencing the flowchart of FIG. 7, the encode processing that encodes the original bit string provided as the input bit string and outputs the encoded bit string is described. The encode processing of FIG. 7 corresponds to step S601 of FIG. 6. Also, as described below, the encoding processing of FIG. 7 is also executed in insert processing and in delete processing.

In step S701, the significant bit length, which is the length of the significant bit portion of the input bit string, is stored as the bit length.

Also, in step S702, the bit position, which expresses the bit position next to be processed in the input bit string, is initialized. Since, in this preferred embodiment, processing is done successively from bit 0, the bit position in step S702 is initialized as 0.

Then, in step S703, the output bit string is initialized as an empty bit string. The values of the bit position and the output bit string are updated by the loop of steps S704 to S708 described below.

Continuing, in step S704, a determination is made whether the current bit position is smaller than the bit length stored in step S701, and if the current bit position is smaller processing proceeds to step S705 and in all other cases processing proceeds to step S709.

In step S705, the value of the bit pointed to by the current bit position is extracted from the input bit string.

Continuing, in step S706, the bit value "1" is appended to the tail end of the output bit string. Then, in step S707, the bit value obtained in step S705 is appended to the tail end of the output bit string.

After that, in step S708 after updating the bit position to point to the next position, return is made to step S704. Also, since in this preferred embodiment the bits are counted from the left as 0th, 1st, 2nd, n-th bit, the "next position" is the next position to the right of the current bit position.

In step S709, a number of bit pairs consisting of "00" equal to the number of don't-care bits in the input bit string are appended to the tail end of the output bit string and processing is terminated.

For example encoded bit string "1110110000" is obtained from the original bit string "101**".

Also, in this preferred embodiment, it is taken that the number of significant bits and the number of don't-care bits in the original bit string are specified separately from the input bit string itself. However, if only fixed length bit strings are to be handled, only one of the two need be specified since the number of don't-care bits can be obtained from the number of significant bits and the opposite is also possible.

Figure 8:
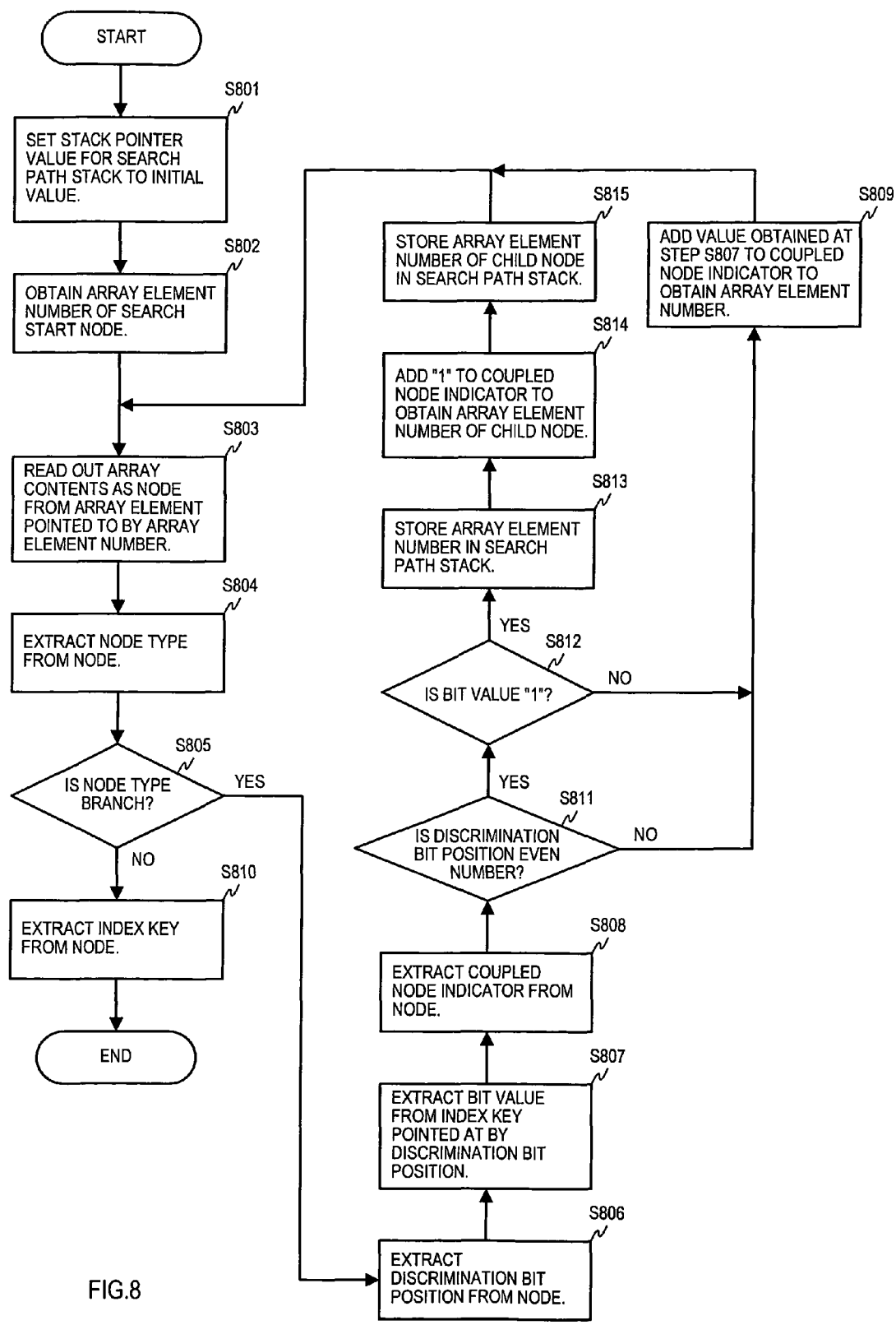
FIG. 8 is a flowchart of an initial search in the search processing.

Next, referencing the flowchart in FIG. 8, details of the processing of step S603 in FIG. 6, wherein the initial search is performed, are described.

In step S801, the value of the stack pointer for search path stack is set to an initial value. This initial value is the value when nothing is stored in the search path stack, and is also used in the processing of FIG. 11 explained below. In the processing of FIG. 8 in this preferred embodiment, the stack pointer is taken to be pointing to a position in the search path stack wherein an array element number should next be pushed in step S813 and is described as such below.

Continuing, in step S802, the array element number of the search start node is acquired. Since the processing of FIG. 8 is executed after the processing of step S602 in FIG. 6, the array element number acquired in step S802 is actually that of the root node. Next, in step S803, the array element pointed to by the array element number acquired in step S801 is read out from the array holding the nodes of the coupled node tree as a node.

Then, in step S804, the node type is extracted from the node read out in step S803 and, in step S805, a determination is made whether the node type is that of a branch node.

If, in the determination of step S805, the node read out is a branch node, processing proceeds to step S806 and information about the discrimination bit position is extracted from the node, and additionally in step S807 the bit value corresponding to, the discrimination bit position read out is extracted from the search key. Then, in step S808, the coupled node indicator is extracted from the node.

Continuing, in step S811, a determination is made whether the discrimination bit position extracted in step S806 is an even number.

In accordance with the encoding of this preferred embodiment, a bit which is an even bit position in the encoded bit string is a distinguishing bit, and a bit which is in an odd bit position is a data bit. Thus, if the determination in step S811 is that of an even number, in order to determine whether the data bit immediately following the distinguishing bit is a significant bit, processing proceeds to step S812, and a determination is made whether the value of the bit extracted in step S807 is a "1".

If the determination in step S812 is that of a "1", in the encoding of this preferred embodiment, data bits with values for the significant bits in the original search key still remain in the search key. For that reason, processing proceeds to step S813, and the array element number of the node read out in step S803 is stored in the search path stack.

Continuing, in step S814, "1" is added to the coupled node indicator extracted in step S808, and the array element number of node [1] that is the child node of the node read out in step S803 is acquired and is set as a new array element number.

Then, in step S815, the array element number of the child node obtained in step S814 is stored in the search path stack, and after incrementing the stack pointer by 1, processing returns to step S803.

Also, the expression "increment by 1" here is an expression accommodating a description using a diagrammatic representation like that of FIG. 5 (c) wherein the search path stack 310 is divided into 2 columns, and this expression is not intended to restrict any actual implementation of the search path stack 310 or the stack pointer.

The search path stack 310 of FIG. 5 (c) is a diagrammatic representation of the array element number stored in step S813 being in the left column and the array element number stored in step S815 being in the right column respectively. The update of the value of the stack pointer in step S815 is equivalent to moving the stack pointer from the row it is pointing at to the next row.

Conversely, if the determination in step S811 is that of an odd number, the discrimination bit position expresses the position of a data bit. Also, if the determination in step S812 is "0", in the encoding of this preferred embodiment, this expresses the fact that the distinguishing bit is 0, in other words, the fact that a bit position encoding don't-care bits in the original search key has been reached.

If the determination in step S811 is of an odd number and the determination in step S812 is "0" then processing proceeds to step S809.

In step S809, the bit value extracted from the search key in step S807 is added to the coupled node indicator extracted in step S808, and the result of that addition is set as the new array element number. After step S809 is executed, processing returns to step S803.

After that, the processing from step S803 to step S815 is repeated until a determination of a leaf node is made in the determination of step S805 and processing proceeds to step S810. In this reiteration, the array element number set in either step S809 or step S814 is used in step S803.

In step S810, the index key is extracted from the leaf node, and processing is terminated.

Also, since the don't-care bits "*" are encoded as "00", given that j is an integer of 0 or larger, if the bit at point $2j$ in the encoded bit string is "0" then the bit at point $2j+1$ is always "0".

Then, of the child nodes of branch nodes whose discrimination bit position is $2j$, the node [0] is always a leaf node holding an index key that is obtained by encoding an original index key wherein all bits from the j-th bit on are all don't-care bits.

Thus if the processing proceeds in the sequence from step S811 to steps S812, S809, S803, S804, and S805, the determination in step S805 is always that of a leaf node and processing always branches to step S810.

The leaf node that is this node [0] is called a terminal-side node when seen from the parent branch node (in the sense that the end of the significant bits has been reached), and the node [1] that is paired with the terminal-side node is called the non-terminal-side node. The processing of step S1107 and S1108 of the FIG. 11 described below is processing to obtain a terminal-side node from a non-terminal-side node.

Figure 9:
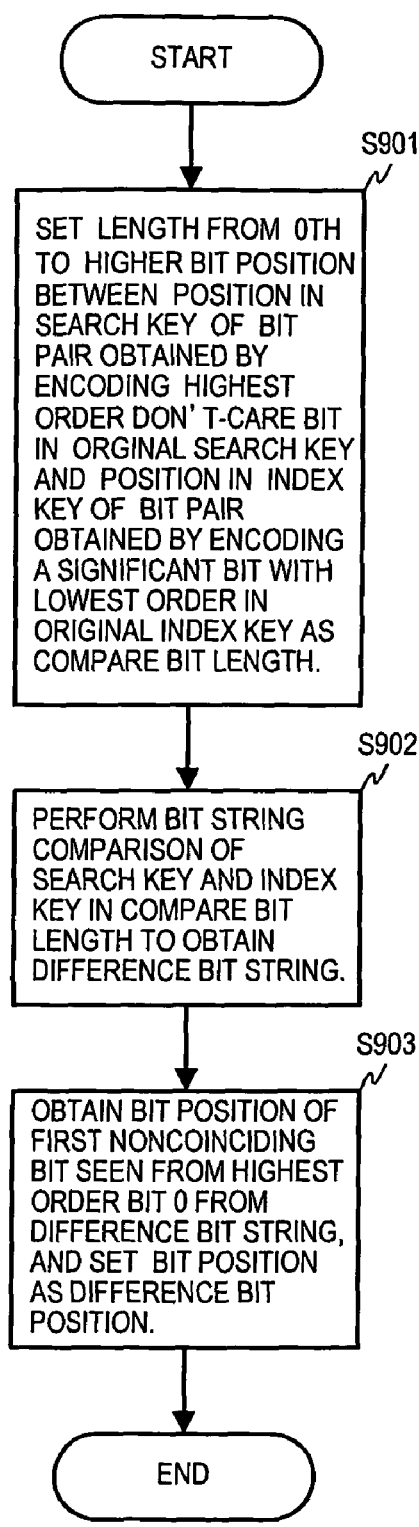
FIG. 9 is a drawing describing the processing for requesting the difference bit position.

Next, referencing the flowchart of FIG. 9, details of the processing of step S604 of FIG. 6 that obtains a difference bit position is described.

In step S901, a compare bit length is set. The value set in the compare bit length is the length from the 0th bit, which is the highest order bit, to the bit position with the higher order comparing the position in the search key of the bit pair that is obtained by encoding the highest order don't-care bit in the original search key and the position, in the index key acquired in step S603 of FIG. 6, of the bit pair that is obtained by encoding a significant bit with the lowest order in the original index key. For example, the compare bit length could be described by (1) to (3) below.

(1) If the original search key does not include significant bits, 2 is set in the compare bit length.

(2) If the original search key includes significant bits but the original index key does not include significant bits, 0 is set in the compare bit length.

(3) If both the original search key and the original index key include significant bits, the compare bit length is described in the following way.

If the position of the highest order don't care bit in the original search is taken to be a (where a equal to or greater than 1) the bit pair that is obtained by encoding the a-th bit of the don't-care bits is the position of the bits $2a$ to $2a+1$ in the search key. Also, if the original search key consists of only significant bits, given that the length of the original search key is n, the equality a=n is assumed for descriptive purposes.

Also, if the position of the lowest order significant bit in the original index key is taken to be b (where a equal to or greater than 0), the bit pair encoding the b-th bit of the significant bits is the position of the bits $2b$ to $2b+1$ in the index key.

Thus if $2a+1$ is less than or equal to $2b+1$, that is, a is less than or equal to b, the length from bit 0 bit $2a+1$, that is, $2a+2$, is set in the compare bit length. Conversely, if $2a+1$ is greater than $2b+1$, that is, a is greater than b, the length from bit 0 to bit $2b+1$, i.e., $2b+2$ is set in the compare bit length.

As described in (1) to (3) above, since the compare bit length set in step S901 is an even number, in the description below the compare bit length is expressed as $2c$ (c greater than or equal to 0) for descriptive purposes.

In step S902, the bit strings of the search key and the index key are compared for the length pointed out by the compare bit length, and the difference bit string is obtained. That is to say, the search key and the index key are compared in the range from bit 0 to bit $2c-1$, and a difference bit string of length $2c$ is obtained.

The difference bit string is a bit string wherein the value of bits at positions where the values of search key and index key coincide is 0, and the value of bits at positions of non-coincidence is 1, and can be obtained by, for example, a non-exclusive OR bit operation.

continuing, in step S903, the highest order position, i.e., as seen from bit 0, the first non-coincident bit, i.e., the bit position of the bit with a value of 1, is set as the difference bit position and processing is terminated.

If non-coincident bits do not exist, it is permissible to set, for descriptive purposes, $2c$, for example, as the difference bit position in step S903 since the difference bit position is not referenced later. Also, when the compare bit length is 0, for descriptive purposes, a negative number is set in difference bit position.

Figure 10:
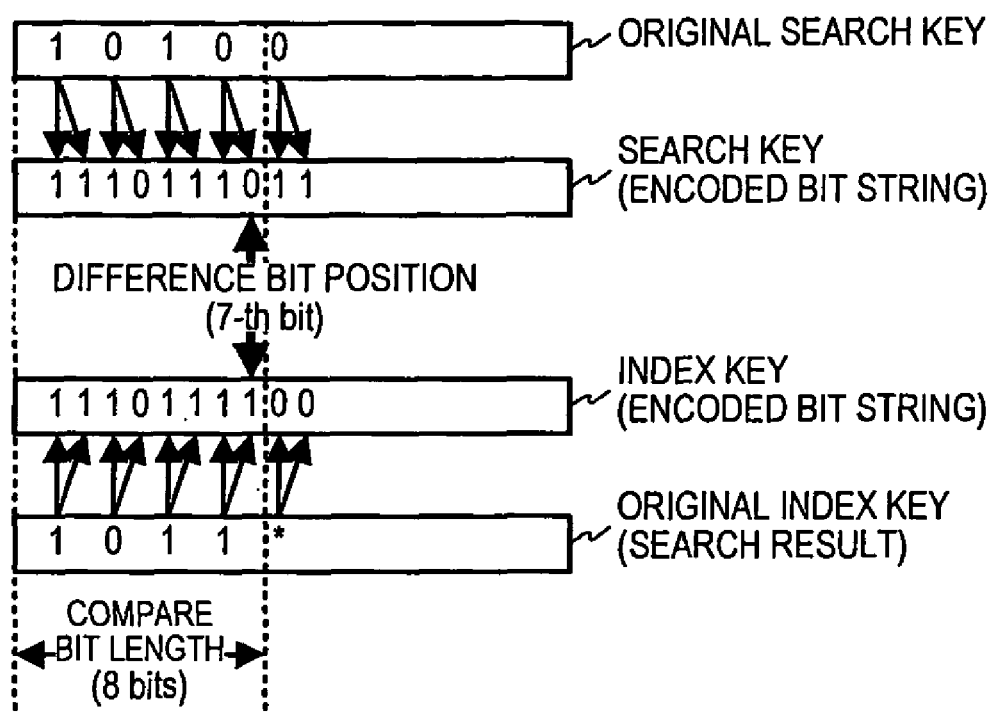
FIG. 10 is a drawing showing an example of a difference bit position.

Next, referencing FIG. 10, a specific example of a difference bit position is described.

In the example of FIG. 10, the search key is the encoded bit string "1110111010" that is obtained by encoding the original search key "10100". Since this original search key comprises only significant bits, by the description in (3) above, a=5 is assumed for descriptive purposes.

On the other hand, the index key obtained in the search of step S603 with this search key is the index key 251e "1110111100" that is obtained by encoding the original index key "1011*" that includes don't-care bits. The position of the lowest order significant bit for this original index key is b=3.

Thus, in step S901 of FIG. 9, since a>b, 8 (=$2b+2$) is set in the comparison bit length. Then, in step S902, an 8-bit difference bit string is obtained and, in step S903, 7 is set in the difference bit position. With the above, the processing of FIG. 9, i.e., step 604 of FIG. 6, is terminated.

Figure 11:
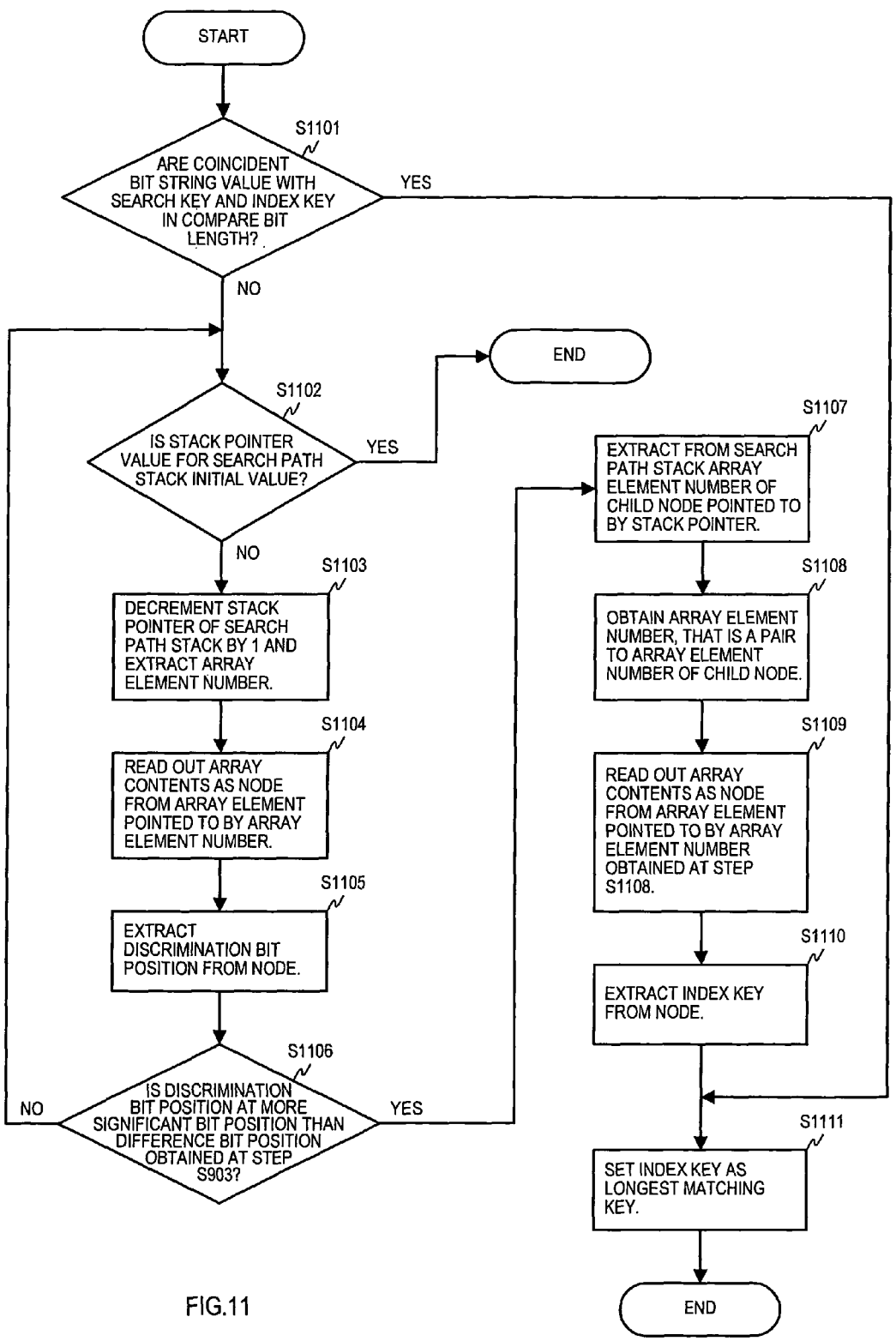
FIG. 11 is a flowchart showing processing acquiring the longest matching key in search processing.

Next, referencing the flowchart of FIG. 11, details of the processing of step S606 of FIG. 6 that acquires a longest matching key is described.

In step S1101, the search key and the index key obtained in step S603 of FIG. 6 are compared for the length of the bit string pointed out by the compare bit length $2c$, i.e., a comparison is made in the range from bit 0, which is the highest order, to bit 2c-1, and a determination is made whether both are coincident.

If in step S1101 the determination is that they are coincident, processing proceeds to step S1111, and the index key obtained in step S603 is set as the longest matching key, and processing terminates.

If in step S1101 the determination is that they are not coincident, processing proceeds to step S1102.

In step S1102, a determination is made whether the value of the stack pointer for the search path stack is the initial value, and, if it is the initial value, a longest matching key is not set and the processing of FIG. 11 is terminated, and if it is not, processing proceeds to step S1103.

As can be understood for the description of step S801 in FIG. 8, in this preferred embodiment, the stack pointer has its initial value either when the stack pointer points to the array element number that was first pushed into the search path stack or when the search path stack is empty.

In step S1103, the stack pointer of the search path stack is decremented by 1 and the array element number is extracted from the search path stack. In other words, the processing of step S1103 is a pop operation.

Also, when the description is adapted to the diagrammatic representation of search path stack 310 in FIG. 5 (*c*), the processing of step S1103 moves the stack pointer up one row and is the processing to extract an array element number from the left column of the row pointed to by the stack pointer after update.

Continuing, in step S1104, the array element pointed to by the array element number extracted in step S1103 is read out, as a node, from the array holding the nodes of a coupled node tree.

Then, in step S1105, a discrimination bit position is extracted from the node read out in step S1104.

Whereat, the array element number extracted in step S1103 is always the array element number pushed into the search path stack in step S813 of FIG. 8, and is not the array element number pushed into the search path stack in step S815 of FIG. 8.

Next, in step S1106, a determination is made the discrimination bit position extracted in step S1105 has a higher order position relationship than the difference bit position obtained in step S903 of FIG. 9.

If the discrimination bit position has a higher order than the difference bit position, processing proceeds to step S1107 and, if not, processing returns to step S1102.

In step S1107, the array element number of the child node pointed to by the stack pointer of the search path stack is read out from the search path stack.

For example, when the stack is made into a diagrammatic representation like that of FIG. 5 (*c*), the stack pointer expresses a position of a row, and the left column expresses the array element numbers of nodes that have a discrimination bit position that is an even number, and the right column expresses the array element number of the node [1] that is the non-terminal-side node of the child nodes of the node with the array element number written into the left column of the same row.

Thus, describing the operation in line with the diagrammatic representation of FIG. 5 (*c*), in step S1107, the array element number in the right column of the row expressed by the stack pointer is read out.

Continuing, in step S1108, the array element number that is a pair to the array element number of the child node read out in step S1107 is obtained.

In this preferred embodiment, since the two nodes that configure a node pair are stored in array elements with adjacent array element numbers both the array element numbers of the 2 nodes that configure a node pair are also a pair. For example, node [0] is stored in an array element with an even array element number, and the node [1] that is a pair to that node [0] is stored in the array element with an odd array element number immediately after [that of the node [0]]. Thus, both even and odd array element numbers are pairs.

In the case of this example, in step S1108, by subtracting 1 from the array element number of node [1] read out in step S1107 the array position of node [0] that configures a node pair with that node [1] is acquired. In other words, the array element number of the terminal-side node, which is a leaf node, is acquired from the array element number of the non-terminal-side node in step S1108.

Next, in step S1109, the array element pointed to by the array element number obtained in step S1108, i.e., the above node [0] that is a terminal-side node and a leaf node, is read out from the array as a node.

Continuing, in step S1110, an index key is extracted from the leaf node read out in step S1109, and in the next step S1111, the read out index key is set as the longest matching key, and the processing of FIG. 11 is terminated.

Next, several detailed examples of the processing of FIG. 6 to FIG. 9 and FIG. 11, using the coupled node tree of FIG. 5, is described.

When the original search key is the "10100" shown in FIG. 5 (*b*) and FIG. 10, in step S603 of FIG. 6, the index key 251*e* of node 211*e* shown in FIG. 5 as "initial search" is obtained.

In that case, as was described referencing FIG. 10, 8 bits are set in the compare bit length, and the difference bit position is 7. Thus, steps S1102 to S1106 in FIG. 11 are executed, and the discrimination bit position 230*d* is extracted from the node 210*d* of the array element number 221*c*.

Since the value of the discrimination bit position 230*d* is 6, and is a higher order position than 7 steps S1107 to S1111 are executed, and the index key 250*e* of node 210*e* expressing "the longest prefix match" in FIG. 5 is set as the longest matching key. This is a case falling under the category of the definition (b) of a longest matching key.

When the original search key is "1100*", the index key 250*f* is obtained in step S603 of FIG. 6. In this case, since the position of the highest order don't-care bit in the original search key is 4 and the position of the lowest order significant bit in the original index key is 3, the compare bit length is 8.

Then, in step S1101 of FIG. 11, a determination is made that the search key and index key coincide, and proceeding to step S1111, index key 250*f* is set in the longest matching key. This example is also an example falling under the category of the definition (a) of a longest matching key.

When the original search key is "11001", the index key 250*f* that is obtained by encoding the original index key "1100*" is obtained in step S603 of FIG. 6.

In this case, since the position of the highest order don't-care bit in the original search key is, for descriptive purposes, taken to be 5 and the position of the lowest order significant bit of the original index key is 3, in step S901 of FIG. 9, 8 is set as the comparison bit length.

Thus, in step S1101 of FIG. 11, a determination is made that the search key and the index key coincide and proceeding to step S1111 the index key 250*f* is set in the longest matching key. This example is also an example falling under the category of the definition (b) of a longest matching key.

When the original search key is "11*", the index key 250***f* that is obtained by encoding the original index key "1100*" is obtained in step S603 of FIG. 6.

In this case, since the position of the highest order don't-care bit in the original search key is 2 and the position of the lowest order significant bit of the original index key is 3, in step S901 of FIG. 9, 6 is set as the comparison bit length. The difference bit position is 4.

Thus, processing proceeds from step S1101 in FIG. 11 to step S1102. Then, steps S1102 to S1106 are executed, and the discrimination bit position 231b is extracted from node 211b of array element number (220a+1). The value of the discrimination bit position 231b is 2, and is of a higher order than 4.

Thus, steps S1107 to S1111 are executed, and the index key 250c of node 210c, encoding "1****", is set as the longest matching key. This example is also an example falling under the category of the definition (b) of a longest matching key.

When the original search key is "0**", the index key 250f that is obtained by encoding the original index key "1**" is obtained in step S603 of FIG. 6. In this case, since the position of the highest order don't-care bit in the original search key is 1 and the position of the lowest order significant bit of the original index key is 0, in step S901 of FIG. 9, 2 is set as the comparison bit length. The difference bit position is 1.

Thus, steps S1102 to S1106 are executed, and the discrimination bit position 230a is extracted from the root node 210a of the array element number 220. The value of the discrimination bit position 230a is 0, and is a higher order position than 1.

Thus steps S1107 to step S1111 are executed, and the index key 250b of node 210b, being obtained by encoding "*****", is set in the longest matching key. This example is also an example falling under the category of the definition (b) of a longest matching key.

In accordance with the above search method as described above, searches can be performed even if both the original search key and the original index key both have don't-care bits, and also, the 2 stages of search and select are not performed, and a uniquely stipulated longest matching key can be acquired.

Figure 12:
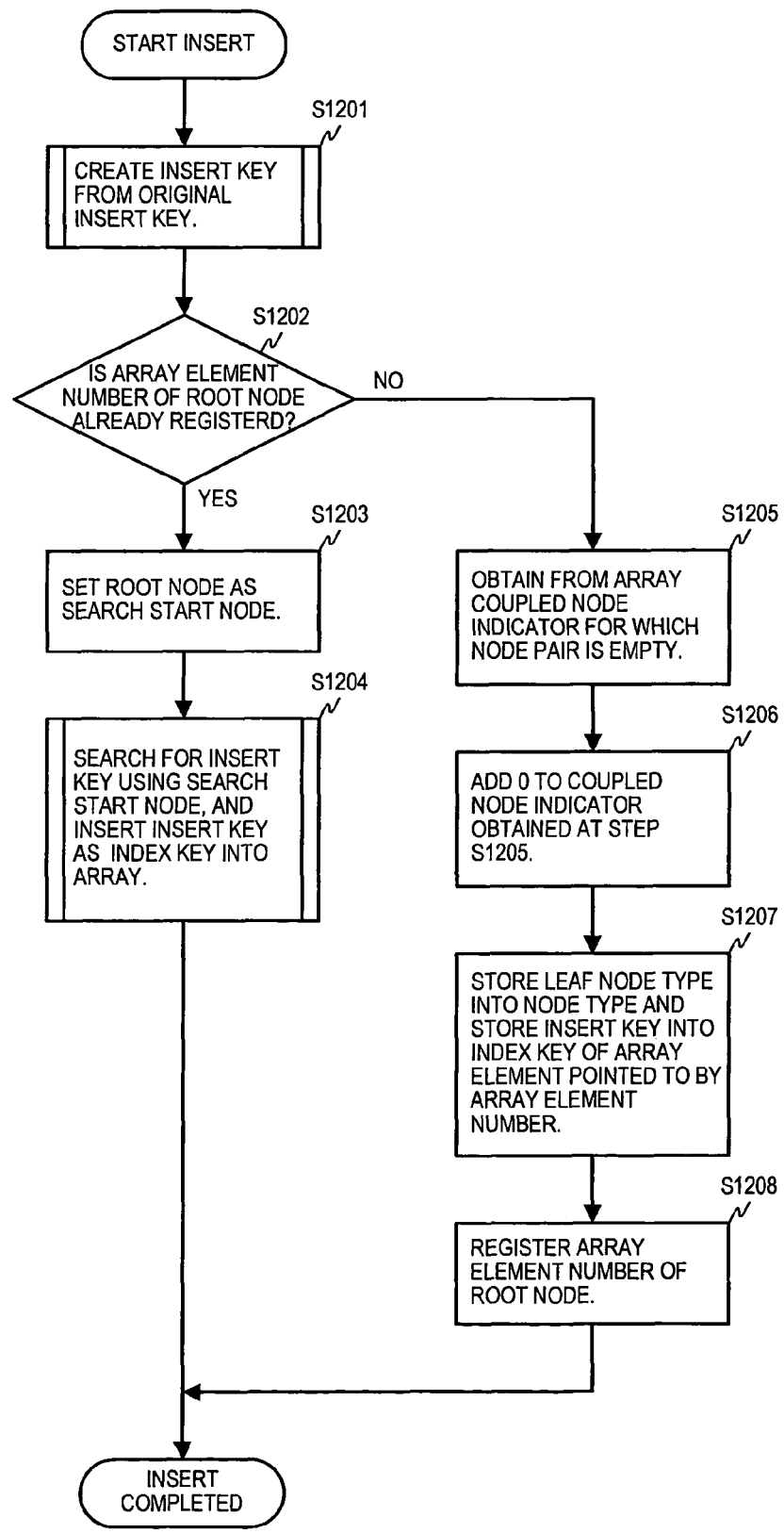
FIG. 12 is a flowchart showing the insert processing in an embodiment of the present invention.
Figure 13A:
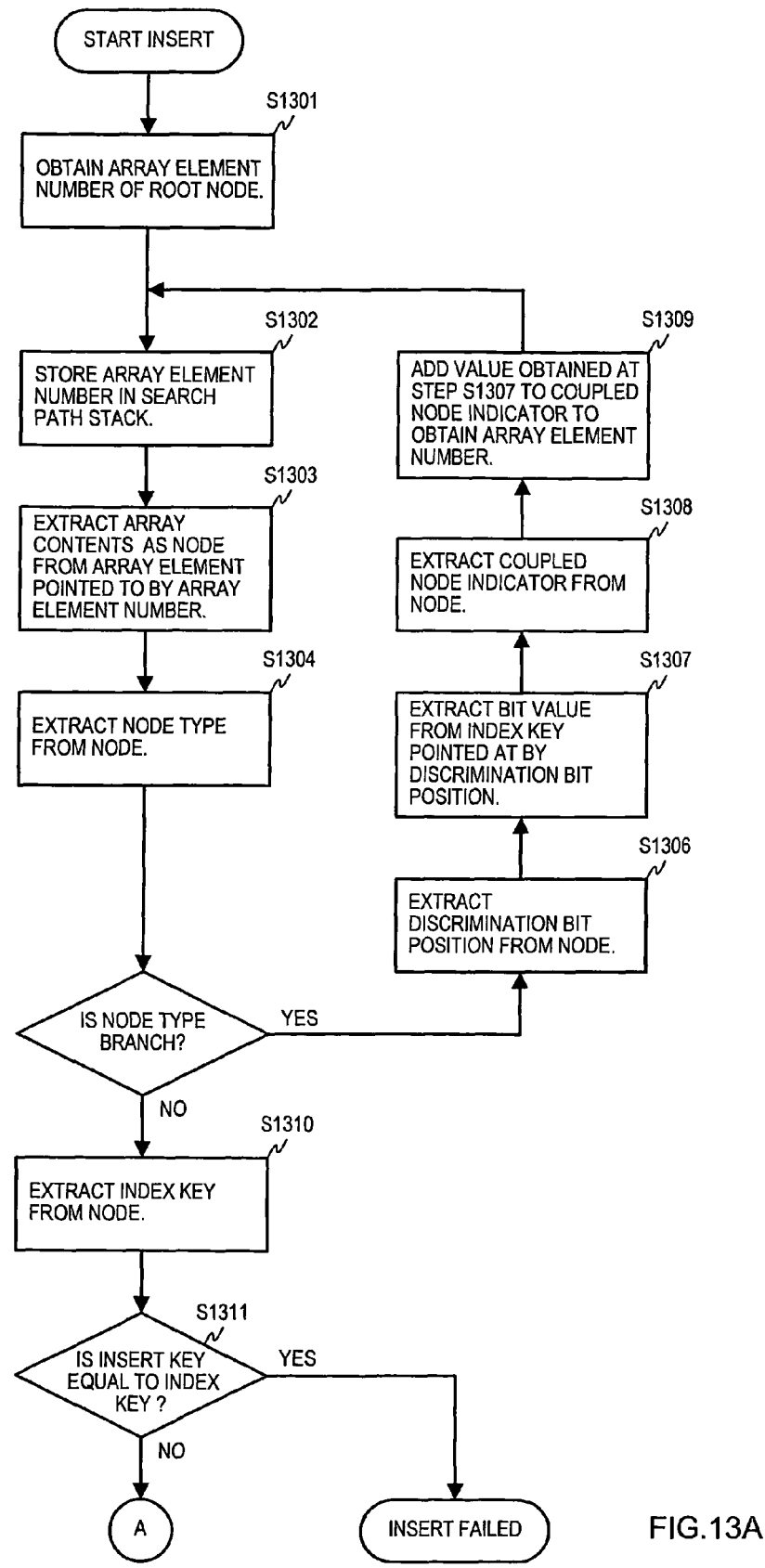
FIG. 13A is a flowchart showing the first stage of insert processing.
Figure 13B:
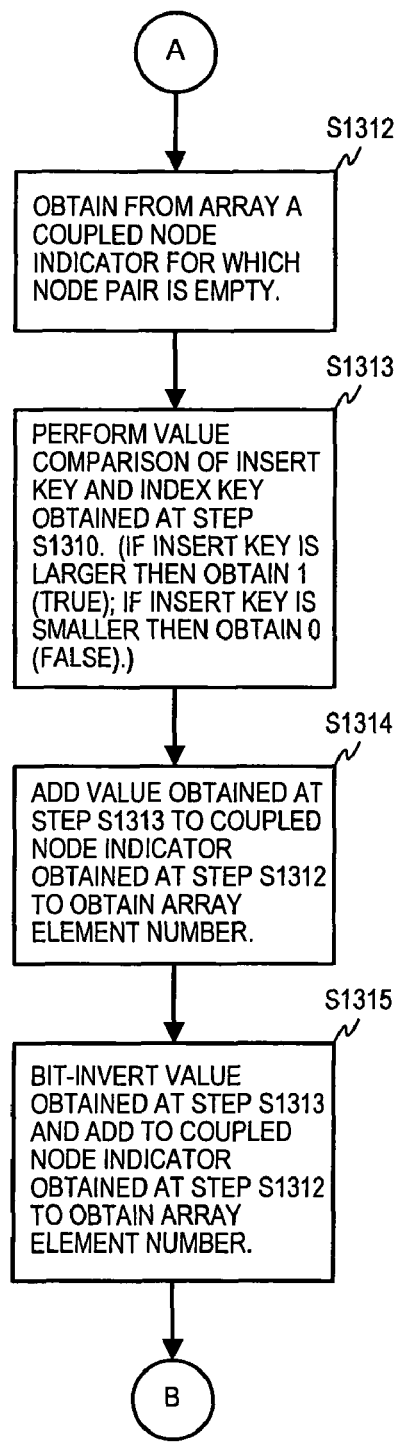
FIG. 13B is a flowchart describing the processing wherein an array element is prepared for a node pair to be inserted.
Figure 13C:
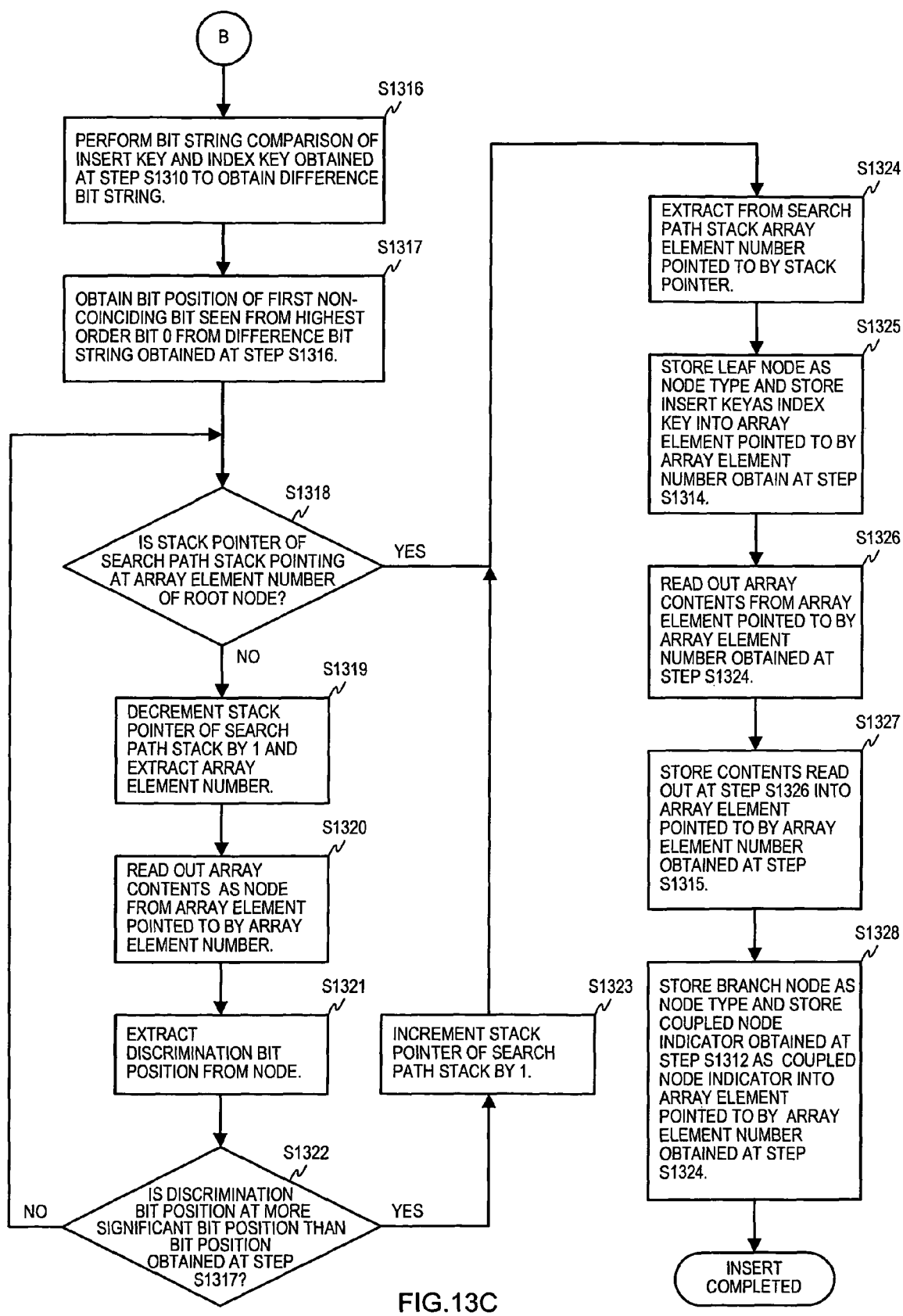
FIG. 13C is a flowchart completing the insert process by determining a position to insert a node pair and storing the contents of each node of a node pair.

Next, referencing the flowcharts of FIG. 12 to FIG. 13C, the process of inserting a leaf node in a coupled node tree for searches using encoded bit strings according to the specification of an original insert key is described. Also, since a coupled node tree is generated by the insert processing of a root node and the ordinary insert processing that inserts nodes other than a root node in an existing coupled node tree, the description the insert processing of nodes is also the description of the processing to generate a coupled node tree.

In step S1201 of FIG. 12, an insert key is created from the specified original insert key by the encode processing of FIG. 7.

Continuing, in step S1202, a determination is made whether the array element number of the root node of the coupled node tree for which that processing is requested is registered. If the determination in step S1202 is that it is registered, processing proceeds to step S1203.

In step S1203 the root node is set as the search start node. Continuing, in step S1204, starting from the search start node, the array holding the nodes of the coupled node tree is searched using the insert key, and the insert key is inserted as the index key (i.e., a leaf node including the insert key as its index key is inserted in the coupled node tree) and the processing of FIG. 12 is terminated. The details of the processing of step S1204 will be described hereinafter, referencing FIG. 13A to FIG. 13C.

Conversely, if the determination in step S1202 is that is not registered, the registration and generation of a completely new coupled node tree is started.

In that case, processing proceeds to step S1205. In step S1205, an empty node pair is obtained from the array, and the array element number of the array element that should be the primary node of that node pair is acquired.

Next, in step S1206, an array element number is obtained for which 0 has been added to the array element number obtained in step S1205. (In this preferred embodiment, since the array element number obtained is identical to the array element number acquired in step S1205, step S1206 can be omitted.)

Furthermore, to insert the root node, in step S1207, 1 (leaf node) is written in the node type of the array element with the array element number obtained in step S1206.

Then, in step S1208, the array element number acquired in step S1206 is registered as the array element number of the root node and the processing of FIG. 12 is terminated.

Next, referencing FIG. 13A to FIG. 13C, details of the processing of step S1204 in FIG. 12 are described. FIG. 13A is a drawing showing the processing flow for search processing, which is the first stage of insert processing, this corresponding to the using of an insert key as a search key in the search processing shown in FIG. 4.

Step S1301 corresponds with step S401 of FIG. 4 where the root node is taken as the search start node. Also, the processing of steps S1302 to S1310 corresponds completely with the steps S402 to S410 of FIG. 4. Thus the description of these steps is omitted.

As can be understood from a comparison of FIG. 4 and FIG. 13A, regardless of whether the index key and the insert key is encoded the search is performed from the search start node to a leaf node using the same processing regardless of whether the index key and the insert key is encoded or not.

Also, it should be noted that the method of using the search path stack in FIG. 13A is the same as that in FIG. 4, and differs with that in FIG. 8 and FIG. 11. In the processing of FIG. 13A in this preferred embodiment, the stack pointer points to a place on the search path stack that stores an array element number pushed by the push operation of step S1302.

At step S1311 in FIG. 13A, a comparison is performed between the insert key and the index key and, because if there is equality the insert key already exists in the coupled node tree, the insert fails, and processing ends. If, however, there is no equality, processing proceeds to step S1312 and thereafter in FIG. 13B.

FIG. 13B is a processing flowchart describing the processing to prepare array elements for a node pair to be inserted.

At step S1312, an empty node pair is obtained from the array, and the array element number of the array element to be made the primary node of the node pair is acquired.

Proceeding to step S1313, a value comparison is performed between the insert key and the index key acquired at step S1310 and, in the case in which the insert key is larger, the Boolean value 1 is obtained, but if the insert key is smaller, the Boolean value 0 is obtained.

Proceeding to step S1314, the Boolean value obtained at step S1313 is added to the array element number of the primary node obtained at step S1312 to obtain an array element number.

Proceeding to step S1315, the logical negation value of the Boolean value obtained at step S1313 is added to the array element number of the primary node obtained at step S1312 to obtain an array element number.

The array element number obtained at step S1314 is the array element number of the array element into which a leaf node having the insert key as an index key is stored, and the array element number obtained at step S1315 is the array element number of the array element into which a node that forms a pair with that leaf node is stored.

That is, by means of the value relationship between the index key stored in the leaf node obtained by the first stage of search processing and the insert key, a determination is made of into which node of the node pair to be inserted the leaf node holding the insert key is to be stored.

For example, in the case of inserting a leaf node containing, as index key, the insert key "1111101100" encoded for the original insert key "1101*", the search path stack contains the array element numbers (220a+1), (220b+1), (220c+1), and 221d. Also, in step S1310, the index key 250f, which is "1111101000", of the node 210f of the array element number 221d is extracted.

Thus, in step S1313, the insert key and the index key are compared and, since the insert key is larger, the Boolean value 1 is obtained, so that the leaf node that holds the insert key is stored in an array element having an array element number obtained by adding 1 to the coupled node indicator of the node pair to be inserted.

Also, if a leaf node including the insert key "1000000000" that is obtained by encoding the original insert key "0****" is inserted in the coupled node tree of FIG. 5 (a) array element numbers 220, 220a+1, and 221b are stored in the search path stack by the processing of FIG. 13A. And, in step S1310, the index key 250c "1100000000" of node 210c is extracted.

Thus, in step S1313, the insert key and the index key are compared and, since the insert key is smaller, the Boolean value 0 is obtained, so that the leaf node that holds the insert key is stored in an array element having an array element number obtained by adding 0 to the coupled node indicator of the node pair to be inserted.

Returning to the explanation of the flowchart, following step S1315 of FIG. 13B, the processing of FIG. 13C is executed. FIG. 13C is a drawing showing the processing flow of storing a node in the array prepared as shown in FIG. 13B, determining the insert position therein, and changing the contents of an existing node to complete the insert processing.

The processing from step S1316 to step S1323 is processing to determine the position on the coupled node tree for insertion of a node pair, and the processing of step S1324 and thereafter is processing for setting data in each node and completing the insert processing.

At step S1316, an exclusive-OR, for example, is obtained of the insert key and the index key obtained at step S1310 so as to obtain a difference bit string.

Proceeding to step S1317, from the difference bit string obtained at step S1316 the first bit position starting from the most-significant 0th bit at which there is a non-coincidence is obtained. This processing can be performed by, for example, a CPU having a priority encoder, the difference bit string being input thereto and the difference bit positions being obtained. It is alternatively possible to perform the equivalent processing using software, to obtain the first bit position at which there is non-coincidence.

Next, proceeding to step S1318, a determination is made as to whether the stack pointer of the search path stack is pointing at the array element number of the root node. If it is, processing proceeds to step S1324, but if it is not processing proceeds to step S1319.

At step S1319, the stack pointer of the search path stack is decremented by 1, and the array element number stacked at that point is extracted.

Proceeding to step S1320, the array element at the array element number extracted at step S1319 is read out as a node.

Proceeding to step S1321, the discrimination bit position is extracted from the node read out at step S1320.

Next, proceeding to step S1322, a judgment is made as to whether the discrimination bit position read out at step S1321 is of higher order than the bit position obtained at step S1317. In this case, the term higher order means more to the left in the bit string, that is having a lower bit position value.

If the result of the judgment at step S1322 is negative, return is made to step S1318, and repetition is done until either the judgment at step S1318 is affirmative or the judgment at step S1322 is affirmative. When an affirmative judgment results at step S1322, at step S1323 the stack pointer of search path stack is incremented by 1, and processing proceeds to the processing of step S1324 and thereafter.

In the above-described processing at step S1316 to step S1323, in order to determine the position of insert of a node pair, a bit string comparison is performed between the insert key and the index key obtained by the search of FIG. 13A, and then a check is made of the relative positional relationship between the leading (most significant) bit position at which the bit value is different in the bit string comparison and the discrimination bit position of the branch node stored in the search path stack. The next branch node link target of the branch node at which the discrimination bit position is more significant is made the insert position for the node pair to be inserted.

For example, if in the above example wherein the original insert key is "1101*" the index key "1111101000" and the insert key "1111101100" differ at the 7-th bit. Also, the discrimination bit position 231d of node 211d pointed to by the array element number 221c+1 extracted by the first execution of step S1319 is 5 and is of a higher order than 7.

Thus by the processing of step S1323, the stack pointer is incremented by one and it points to the place in the search path stack where the array element number 221d of the node 210f is stored.

Also, in the case of the above example wherein the original insert key is "0xxxx", the index key "1100000000" and the insert key "1000000000" differ at bit 1.

Thus, in this example, by repeating the processing of steps S1318 to S1322, the search path stack is successively traversed in reverse checking the relative position relationship between the obtained bit position 1 and the discrimination bit position of the branch nodes of which the array element number is stored in the search path stack until the discrimination bit position becomes more significant.

The result is that, in step S1322, the status becomes one wherein root node 210a, with the array element number 220, which has the discrimination bit position 230a with the value "0" is pointed to. Then, at step S1323, the stack pointer is incremented by one and it points to the place in the search path stack where the array element number (220a+1) of the node 211b is stored.

Even if the root node is reached by traversing the search path stack in reverse, there will be cases wherein the discrimination bit position of the root node is not a bit position that is more significant than the bit position of the most significant bit having a different bit value in the previously determined bit string comparison and wherein the upper-order bits of the index keys of the coupled node tree all have values equal to the upper-order bits of the index key higher than the discrimination bit position of the root node. This means that in the index key to be inserted, there is the first bit value that differs with the value of a bit that is more significant than the discrimination bit position of the root node.

Therefore, in this case, the node pair to be inserted becomes the direct link target of the root node, and the discrimination bit position of the root node changes to the position of the most significant bit of the insert key which differs in value from the existing index key.

Next, the processing of step S1324 and thereafter, which is the processing to set data in each node and to complete the insert processing, will be described.

At step S1324, the array element number that is pointed to by the stack pointer of the search path stack is extracted.

At step S1325, 1 (leaf node) is stored in the node type of the array element pointed to by the array element number obtained at step S1314 and the insert key is stored in the index key.

Proceeding to step S1326, the array element at the array element number obtained at step S1324 is read out from the array.

Next, at step S1327, the contents read out at step S1315 are stored in the array element having the array element number obtained at step S1326.

Finally, at step S1328, 0 (branch node) is stored in the node type of the array element pointed to by the array element number obtained in step S1324, the bit position obtained at step S1317 is stored in the discrimination bit position, and the array element number obtained at the step S1312 is stored in the coupled node indicator.

In the case of the above example wherein the original insert key is "1101x", the node [1] of the empty node pair acquired in step S1325 is taken to be the leaf node for keeping the insert key.

Then, in step S1327, the contents of node 210f is written into node [0]. Next, in step S1328, 7 is stored in the discrimination bit position 230f of node 210f, and the array element number of the array element holding the primary node of the acquired node pair is stored in the coupled node indicator.

On the other hand, in the case of the above example wherein the original insert key is "0xxxx", the node [0] of the empty node pair acquired in step S1325 is taken to be the leaf node for keeping the insert key.

Then, in step S1327, the contents of node 211b is written into node [1]. Next, in step S1328, 1 is stored in the discrimination bit position 231b of node 211b, and the array element number of the array element holding the primary node of the acquired node pair is stored in the coupled node indicator.

As described above, it will be understood that when there is a set of index keys, the index keys are successively extracted therefrom, and the processing of FIG. 12 to FIG. 13C is repeated so as to enable the creation of a coupled node tree according to the present invention corresponding to the set of index keys.

Next, referring to drawings FIG. 14 to FIG. 15B, the processing flow for deleting a leaf node from a coupled node tree for searches using encoded bit strings in accordance with the specification of an original delete key will be described.

Figure 14:
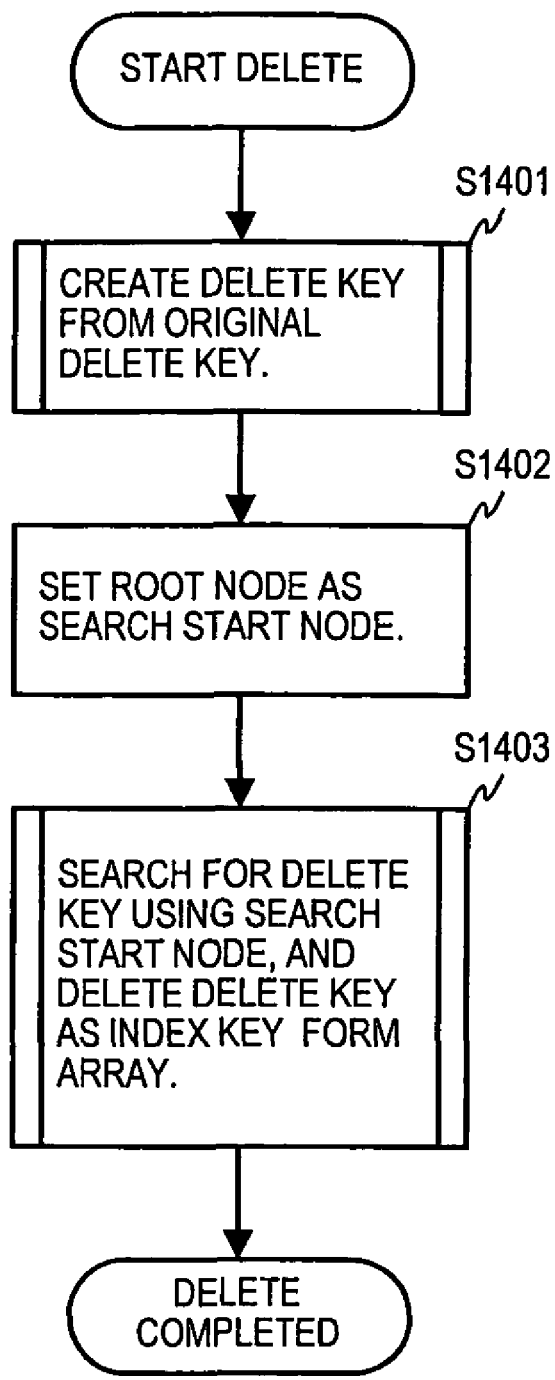
FIG. 14 is a flowchart showing the delete processing in an embodiment of the present invention.

At step S1401 of FIG. 14, the delete key is created from the specified original delete key using the encoding processing of FIG. 7. Continuing, at step S1402, the root node of the coupled node tree is set as the search start node. Then, at step S1403, beginning from the search start node, the array containing the coupled node tree is searched using the delete key, and a leaf node containing an index key that coincides with the delete key is deleted from the coupled node tree.

Next, referring to FIG. 15A and FIG. 15B, the processing of step S1403 of FIG. 14 will be described in detail.

Figure 15A:
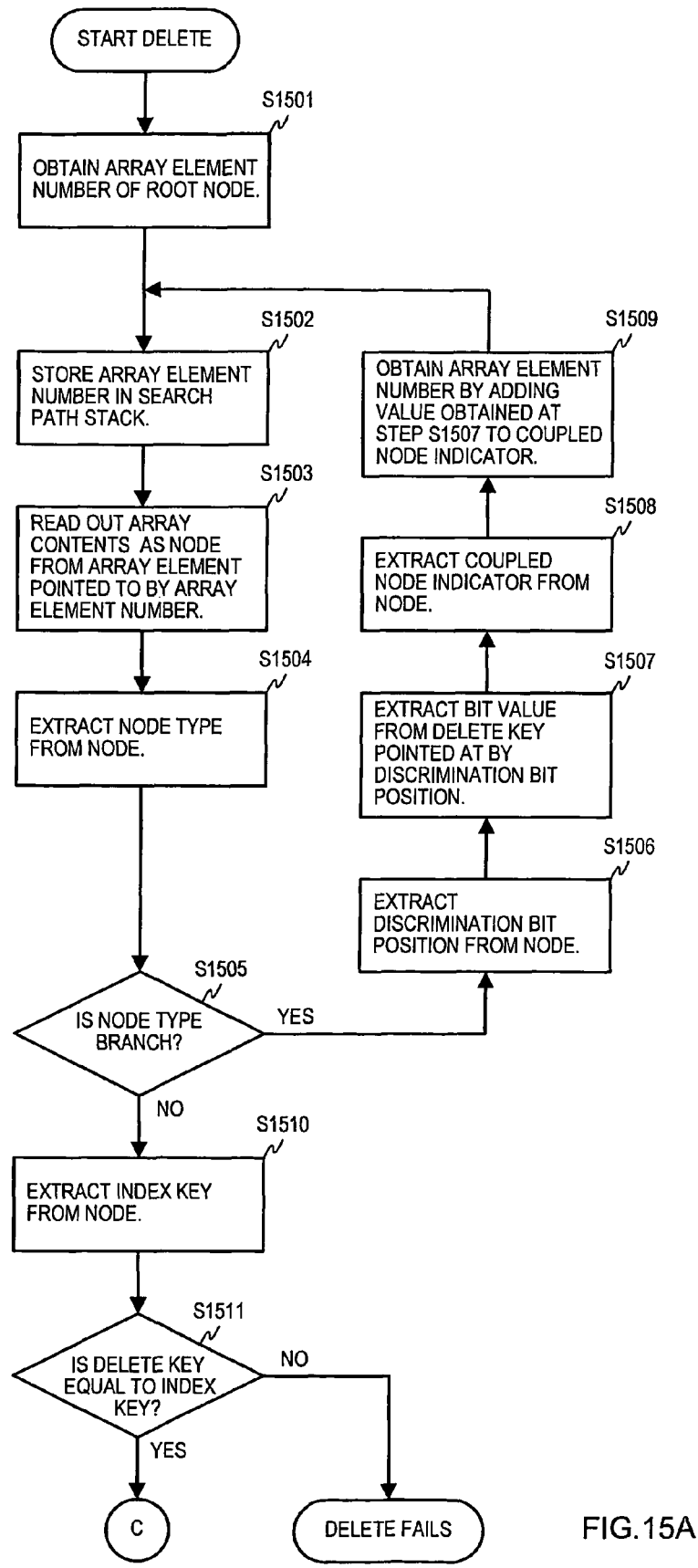
FIG. 15A is a flowchart showing the first stage of delete processing.

FIG. 15A is a drawing showing the processing flow for search processing, which is the first stage of delete processing, this corresponding to the using, of a delete key as the search key in the search processing shown in FIG. 4.

Step S1501 corresponds with step S401 of FIG. 4 wherein the root node has been taken as the search start node. Also, the processing of step S1502 to step S1510 corresponds completely to step S402 to step S410 of FIG. 4. Thus these steps will not be described herein.

In step S1511 in FIG. 15A, a comparison is performed between the delete key and the index key and if there is no equality the delete fails because the index key to be deleted does not exist in the coupled node tree, and processing ends. If, however, there is equality, processing proceeds to the following processing, that is, that of steps S1512 and thereafter in FIG. 15B.

Figure 15B:
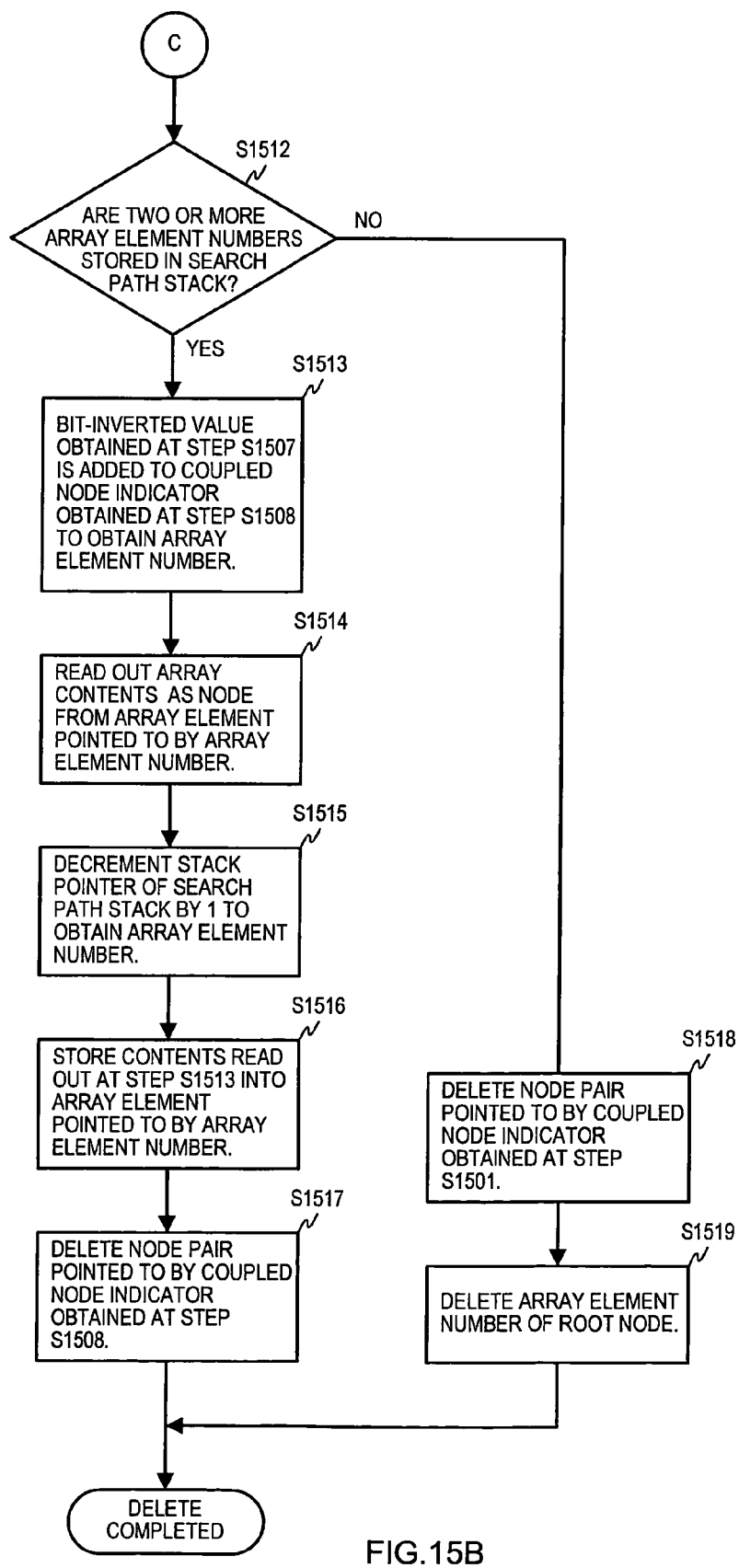
FIG. 15B is a flowchart showing the second stage of delete processing.

FIG. 15B is a drawing describing the processing flow of the latter stage of the delete processing.

First, at step S1512, a judgment is made as to whether or not there are at least 2 array element numbers on the search path stack. Stated differently, the condition in which there are fewer than 2 array element numbers is the one in which there is only 1, this being the array element number of the array element in which the root node is stored.

In this case, processing proceeds to step S1518, at which the node pair of the array element number of the root node obtained at step S1501 is deleted. Next, proceeding to step S1519, the array element number of the root node that had been registered is deleted, thereby completing the processing.

If at step S1512 the judgment is made that there are two or more array element numbers stored in the search path stack, processing proceeds to step S1513, at which an array element number is obtained by adding the inversion of the value obtained at step S1507 is added to the coupled node indicator obtained at step S1508. This processing is performed to determine the array element number of a node at which is stored that forms a pair with a leaf node at which is stored the index key to be deleted.

Next, at step S1514, the contents of the array element having the array element number obtained at step S1513 are read out, and at step S1515 the stack pointer of the search path stack is decremented by 1 and the array element number is extracted.

Next, at step S1516, the contents of the array element having the array element read out at step S1514 are written over the array element having the array element number obtained at step S1515. This processing replaces the branch node that is the link source to the leaf node in which the index key to be deleted with the above-noted node that forms a pair with the leaf node.

Finally, at step S1517, processing is completed by deleting the node associated with the coupled node indicator obtained in step S1508.

As explained above, in delete processing, just like in insert processing, the search is done from a search start node to a leaf node by the same processing as in FIG. 4 regardless of whether the index key or delete key are encoded. Also, the usage of the search path stack in delete processing is the same as in FIG. 4, and differs from that in FIG. 8 and FIG. 11. In this respect, the delete processing of drawings FIG. 14 to FIG. 15B is similar to that of the insert processing of drawings FIG. 12 to FIG. 13C.

Below, an example is described wherein delete processing specifying the original delete key "1011*" is performed for the coupled node tree in FIG. 5 (a).

First, in step S1401 of FIG. 14, the delete key "1110111100" is generated from the original delete key "1011*" and, in step S1403, the processing of FIG. 15A and FIG. 15B is performed using this delete key.

In the processing of FIG. 15A, first, in step S1501, the array element number 220 of the root node is obtained.

Continuing, the array element numbers 220, 220*a*+1, 221*b*+1, 221*c*, and 220*d*+1 are pushed into the search path stack by the processing of FIG. 15A. Then, in step S1511 of FIG. 15A, the index key 251*e* of node 211*e* stored in array element number 220*d*+1 is compared with the delete key, and since both coincide, processing proceeds to FIG. 15B.

In step S1513 of FIG. 15B the array element number 220*d* is obtained and in step S1514 the contents of node 210*e* stored in the array element number 220*d* is read out.

Continuing, in step S1515 the array element number 221*c* is extracted, and, in step S1516, the contents of node 210*e* is stored into node 210*d*, which is contained in array element number 221*c*, and in step S1517 the node pair 201*e* expressed by array element number 220*d* is deleted and delete processing is terminated.

Just as is described above, the range of existing nodes that are affected by the above insert processing and delete processing is minimal, and the advantage of coupled node trees with respect to the low maintenance cost for insertions and deletions is preserved. Also, by using the above encoding method, these advantages are preserved and a high speed longest-match search is enabled that takes into account don't-care bits. Then, since this is a high speed longest-match search that takes into account don't-care bits, when seen from the point of view of necessary costs, the cost of the above encoding method is, for example, markedly lower than the cumbersome preprocessing performed in Patent Reference 3 and Patent Reference 4.

The above describes details of the preferred embodiment for implementing this invention but the embodiments for implementing this invention are not limited to this embodiment and various modifications are possible.

In the above preferred embodiment the node [0] which is linked in association with the bit value 0 is taken as the primary node and the node [1] which is linked in association with the bit value 1 is taken as the non-primary node paired with the primary node. However, it is also allowed to take node [1] as the primary node and node [0] as the non-primary node. Also, it is clear from the description related to FIG. 2B and others that it is discretionary as to whether the root node is arranged in the position of a primary node or arranged in the position of a non-primary node.

In the above preferred embodiment, an encoded bit string is stored in the index key of a leaf node. However, it is possible to modify the above preferred embodiment so that a bit string in a different format is stored as the index key of a leaf node.

Since there is a prerequisite that don't-care bits do not precede significant bits, it is possible, for example, to store in an un-encoded format only the significant bit portion of the original bit string as an index key. if the original bit string has a fixed length, it is also possible to obtain the number of don't-care bits from an index key in this kind of format.

Also, for an index key in this kind of format, it is possible to reduce the storage capacity needed for leaf nodes by half or more since the length of the original bit string is half or less of the encoded bit string. In other words, it becomes possible to handle bit strings whose length is twice or more in the same storage capacity for leaf nodes. Either way, the usage efficiency of the memory area is improved.

Also, it is clear that, in a preferred embodiment that uses index keys with this kind of format, it is necessary to make appropriate changes to the above preferred embodiment with regard to, for example, in step S604 of FIG. 6, first encoding the index key and then comparing it with the original search key, and so forth.

Alternatively, the original bit string can be expressed by being combined with a bit string set with an arbitrary bit value for the don't-care bits and a bit string expressing the range of significant bits (for example, a masking bit string or a bit string expressing a numerical value and so forth), and that combination can be stored as the index key of a leaf node.

Also, in the above preferred embodiment, an un-encoded original search key is obtained as input and the search processing includes encoding. However, if a pre-encoded search key is obtained as input, the encode processing is unnecessary. The same can also be said for insert processing and delete processing.

Also, the encode processing can be implemented in methods other than the method shown in FIG. 7. For example, it is allowed to use an interlinked method that extracts each bit one at a time from the input bit string while shifting the input bit string one bit at a time in a mechanism like a shift register, and interlinks the extracted bit and the distinguishing bit.

Also, encoding methods other than the encoding method used in the above preferred embodiment can be used. The encoding method of the above preferred embodiment encodes each single bit in the original bit string with 2 bits in the encoded bit string, but encoding methods other an encoding method that has this correspondence relationship of 1:2 can be used.

For example, 1 bit in the original bit string can be encoded with 3 bits in the encoded bit string. Also, the distinguishing bit encoding method of the above preferred embodiment expresses a value of 0 for don't-care bits and a value of 1 for significant bits, but the reverse is also possible.

Also, the search processing must be suitably modified in line with the encoding method. For example, if the encoding method used is the reverse of the "0" and "1" of the distinguishing bit of the above preferred embodiment, it is necessary to modify step S812 of FIG. 8 so that when the bit value is 0 the processing proceeds to step S813 and when the bit value is 1 the processing proceeds to step S809, and to change step S814 so that 1 instead of 0 is added to the coupled node indicator. On the other hand, insert processing and delete processing can use the methods of the above preferred embodiment regardless of the encoding method.

Also, longest matching key is "0000000000" being obtained by encoding "***" when, in FIG. 5 above, "0" is used as the original search key, but in this case the set that is expressed by the original bit string "*" of the longest matching key encompasses bit strings starting with "1". However, at the highest order bit, bit 0, the bit strings starting with "1" differs from the original search key "0**". Depending on the purpose of the search it can be desirable to handle this case as a search failure.

Whereat, it can be seen that at least bit 0 of the original bit string of the longest matching key is a significant bit, and that the constraint that at least bit 0 of the original bit string of the longest matching key and the original search key must coincide is also entailed. Since this constraint is entailed, it is allowed to modify the processing of FIG. 6 in the following way.

In other words, a new step S605 to determine whether the sought-for difference bit position is bit 0 is added between step S604 and step S606.

When the difference bit position is bit 0, the search fails because no longest matching key exists in the coupled node tree that satisfies the above constraint, and the processing of FIG. 6 is terminated. Conversely when, in step S605, the difference bit position is not bit 0, processing proceeds to step S606.

Alternatively, this modified example can be further modified such that if the difference bit position in step S605 is 1 or less, processing can be terminated, and if the difference bit position is 2 or more processing can proceed to step S606.

Also, if the search method of this invention is used in an application area wherein it is guaranteed that the significant bit length of the search key is invariably longer than that of the index keys, step S812 of FIG. 8 can be deleted when the discrimination bit position in step S811 is an even number, processing can proceed to step S813.

The above search processing can be variously modified in other ways depending on the intended purpose. For example, in step S602 of FIG. 6, the root node is set as the search start node, but a root node of an arbitrary subtree can also be set as the search start node.

Also, each of the above processes uses a search path stack, but the search path stack implementation method is discretionary. FIG. 5 shows the search path stack divided into two columns to facilitate understanding but this diagrammatic representation is not intended to restrict the implementation method for a search path stack.

Furthermore, in the processing of FIG. 8, the array element numbers of branch nodes for which the discrimination bit position is an even number and the node [1] that is their child node are stored in the search path stack to make the processing more efficient. However, just as for insert processing and delete processing, it is also permissible to store in the search path stack the array element numbers of all the nodes traversed in the path from the search start node to the leaf node.

In this case, instead of the steps S1107 and S1108 of FIG. 11, array element number of the branch nodes is read out from the search path stack, and the branch node for this array element number is read out from the array and its coupled node indicator can be read out. Since the coupled node indicator which is read out is the array element number of a node [0], which is the primary node of the child nodes of this branch node, it is possible to execute a process identical to steps S1109 and following in FIG. 11.

Alternatively, the array element number of the non-terminal-side node [1] obtained in step S814 of FIG. 8 is stored in the search path stack in step S815 but the above preferred embodiment can be modified so that the array element number of the terminal-side node [0] is stored in the search path stack in step S815.

However, even in this case, the array element number of node [1] obtained in step S814 is the same as that in FIG. 8 from the point of view of being read out in step S803 immediately following step S815. If this kind of modification is done, instead of steps S1107 and S1108 of FIG. 11, it is sufficient to read out the array element number of a node [0] directly from the search path stack.

Also, it is clear that the apparatus that implements the search method, the insert method, or the delete method of this invention and the storage means for storing the coupled node tree and the processing shown in each of the flowcharts can be implemented on a computer in a computer program to be executed by a computer. Therefore, the above-noted programs, and a computer-readable storage medium into which the programs are stored are encompassed by the embodiments of the present invention.

What is claimed is:

1. A bit string search apparatus comprising:
a coupled node tree which is used in a bit string search and comprises a root node and a node pair, the node pair being a branch node and leaf node, or a pair of branch nodes, or a pair of leaf nodes located in adjacent storage areas,
the root node being a node that expresses a starting point of the tree and, which is a leaf node when there is one node in the tree and a branch node when there are two or more nodes in the tree,
the branch node including a discrimination bit position of a search key for the bit string search, and position information indicating a position of a primary node, which is one node of a node pair of a link target, and
the leaf node including an index key that is a bit string that is a target of a search, wherein
the index key comprises an encoded bit string that is obtained by encoding a significant bit prefixed bit string, which is either a bit string of only significant bits or a bit string of only don't-care bits or a bit string comprising one or more significant bits to which one or more don't-care bits are suffixed, and
the search key comprises an encoded bit string that is obtained by encoding a significant bit prefixed bit string, and
the encoded bit string is a bit string which is a sequence of bit pairs corresponding to each bit configuring the significant bit prefixed bit string and is a bit string comprising bit pairs with a distinguishing bit which expresses whether the bit is a don't-care bit or a significant bit and, if the bit is a don't-care bit, with a bit with a previously decided value, and, if the bit is a significant bit, with a data bit expressing the value of that bit;
an initial search means performing, with the root node of an arbitrary subtree of the coupled node tree as a search start node, repeated and successive linkage to a primary node of a node pair of the link target or a non-primary node that is a pair to that primary node, in accordance with a bit value of a search key at the discrimination bit position included in the branch node until the leaf node is reached, while memorizing a path being traversed by at least memorizing address information of the branch nodes with the discrimination bit position corresponding to the position wherein exists a distinguishing bit in the encoded bit string;
an index key acquiring means acquiring an index key from the leaf node reached by the initial search means;
a difference bit position acquiring means which compares bits strings between the index key and the search key in the range from the head of the bit string until the bit position which is closer to the head of the bit string, which bit position is determined by comparing the position of the bit pair that is encoded at the tail end of the significant bits of the index key acquired above and the position of the bit pair that is encoded at the first of the don't-care bits in the search key, and which acquires the bit position of the highest-order differing bit value as a difference bit position;
a first longest matching key acquiring means which acquires the index key acquired above as a longest matching key if the index key acquired above and the search key coincide in the above range;
a branch node selecting means which, if the result of the above comparison indicates that the index key acquired above and the search key do not coincide, selects the branch node with a discrimination bit position that is a bit position closest to the tail end of the encoded bit string, from among the branch nodes on the path where the discrimination bit position of that node points to one of the positions of the distinguishing bits in the encoded bit string and its discrimination bit position is a bit position closer to the head of the encoded bit string than the difference bit position; and a second longest matching key acquiring means which acquires, as the longest matching key, the index key of a terminal-side node of the node pairs linked to from the branch node selected above, the terminal-side node which is the leaf node that is linked to in accordance with a distinguishing bit value which expresses a don't-care bit.

2. A bit string search method wherein the bit string search apparatus according to claim 1 searches the index keys based on the coupled node tree data structure, comprising:

an initial search step performing, with the root node of an arbitrary subtree of the coupled node tree as a search start node, repeated and successive linkage to a primary node of a node pair of the link target or a non-primary node that is a pair to that primary node, in accordance with a bit value of a search key at the discrimination bit position included in the branch node until the leaf node is reached, while memorizing a path being traversed by at least memorizing address information of the branch nodes with the discrimination bit position corresponding to the position wherein exists a distinguishing bit in the encoded bit string;

an index key acquiring step acquiring an index key from the leaf node reached in the initial search step;

a difference bit position acquiring step which compares bits strings between the index key and the search key in the range from the head of the bit string until the bit position which is closer to the head of the bit string, which bit position is determined by comparing the position of the bit pair that is encoded at the tail end of the significant bits of the index key acquired above and the position of the bit pair that is encoded at the first of the don't-care bits in the search key, and which acquires the bit position of the highest-order differing bit value as a difference bit position;

a first longest matching key acquiring step which acquires the index key acquired above as a longest matching key if the index key acquired above and the search key coincide in the above range;

a branch node selecting step which, if the result of the above comparison indicates that the index key acquired above and the search key do not coincide, selects the branch node with a discrimination bit position that is a bit position closest to the tail end of the encoded bit string, from among the branch nodes on the path where the discrimination bit position of that node points to one of the positions of the distinguishing bits in the encoded bit string and its discrimination bit position is a bit position closer to the head of the encoded bit string than the difference bit position; and a second longest matching key acquiring step which acquires, as the longest matching key, the index key of a terminal-side node of the node pairs linked to from the branch node selected above, the terminal-side node which is the leaf node that is linked to in accordance with a distinguishing bit value which expresses a don't-care bit.

3. The bit string search method according to claim 2, wherein the index key in the leaf nodes is a significant prefix bit sting before encoding instead of an encoded bit string and, instead of the index key acquired above, an encoded bit string being obtained by encoding the above acquired index key is compared with the search key in the difference bit position acquiring step and the first longest prefix matching key acquiring step.

4. The bit string search method according to claim 2, wherein the initial search step memorizes, in addition to the position information of the branch node, position information that indicates the position of a non-terminal-side node of the node pair linked to from that branch node, the non-terminal-side node which is linked to in accordance with distinguishing bit value which expresses a significant bit.

5. The bit string search method according to claim 4, wherein in the second longest matching key acquiring step, the position information of the terminal-side node that is paired with the non-terminal-side node is obtained from the memorized position information of the non-terminal-side node.

6. The bit string search method according to claim 2, wherein the path is memorized in a stack.

7. The bit string search method according to claim 2, wherein the coupled node tree is stored in an array, and the position information included in a branch node is an array element number of an array element of the array in which is stored the primary node that corresponds to the position information.

8. A computer-readable storage medium storing a program that a computer is caused to execute, for performing the bit string search method according to claim 2.

9. An insert method for inserting a leaf node that includes an index key comprising a desired bit string into a coupled node tree of a bit string search apparatus according to claim 1, wherein the desired bit string is specified by a format of either an encoded bit string or a significant bit prefixed bit string before encoding, the insert method comprising:

repeatedly and successively linking to a primary node of a node pair of the link target or a non-primary node that is a pair to that primary node, in accordance with a bit value of the search key at the discrimination bit position included in the branch node, from the root node until the leaf node is reached, while memorizing a path being traversed, by using the specified encoded bit string as the search key if the desired bit string is specified as an encoded bit string, or by obtaining an encoded bit string through encoding the specified significant bit prefixed bit string and using the obtained encoded bit string as the search key if the desired bit string is specified as a significant bit prefixed bit string;

performing a value comparison and a bit string comparison between the index key of the leaf node and the search key;

determining a position for insert of a node pair that includes a leaf node including the index key to be inserted and another node by the relative positional relationship between a difference bit position, which is the highest order bit position that differs in the bit string comparison, and the discrimination bit position of a branch node on the path; and determining, by the value comparison, which node of the node pair to be inserted is the leaf node including the index key which comprises the desired bit string.

10. The insert method according to claim 9, wherein the index key of the leaf node comprises a significant bit prefixed bit string instead of an encoded bit string, and before the value comparison and bit string comparison is performed an encoded bit string is obtained by encoding the index key and instead of performing the value comparison and bit string comparison between the index key of the leaf node and the search key, the value comparison and bit string comparison is performed between the obtained encoded bit string and the search key.

11. The insert method according to claim 9, wherein the coupled node tree is stored in an array, and
the position information included in a branch node is an array element number of an array element of the array in which is stored the primary node that corresponds to the position information.

12. A computer-readable storage medium storing a program that a computer is caused to execute, for performing the insert method according to claim 9.

13. A delete method for deleting a leaf node that includes an index key comprising a desired bit string from a coupled node tree of a bit string search apparatus according to claim 1, wherein the desired bit string is specified by a format of either an encoded bit string or a significant bit prefixed bit string before encoding, the insert method comprising:
repeatedly and successively linking to a primary node of a node pair of the link target or a non-primary node that is a pair to that primary node, in accordance with a bit value of the search key at the discrimination bit position included in the branch node, from the root node until the leaf node is reached, by using the specified encoded bit string as the search key if the desired bit string is specified as an encoded bit string, or by obtaining an encoded bit string encoding the specified significant bit prefixed bit string and using the obtained encoded bit string as the search key if the desired bit string is specified as a significant bit prefixed bit string;
storing the contents of the node that is paired with the leaf node into the branch node that is the link source for that leaf node; and deleting that node pair.

14. The delete method according to claim 13, wherein the index key of the leaf node comprises a significant bit prefixed bit string instead of an encoded bit string.

15. The delete method according to claim 13, wherein the coupled node tree is stored in an array, and the position information included in a branch node is an array element number of an array element of the array in which is stored the primary node that corresponds to the position information.

16. A computer-readable storage medium storing a program that a computer is caused to execute, for performing the delete method according to claim 13.

17. A computer-readable storage medium storing a tree data structure for use of bit string searches, comprising:
a root node and a node pair, the node pair being a branch node and leaf node, or a pair of branch nodes, or a pair of leaf nodes located in adjacent storage areas, wherein
the root node is a node that expresses a starting point of the tree and, which is a leaf node when there is one node in the tree and a branch node when there are two or more nodes in the tree, and
the branch node includes a discrimination bit position of a search key for the bit string search, and position information indicating a position of a primary node, which is one node of a node pair of a link target, and
the leaf node includes an index key that is a bit string that is a target of a search, and
the index key comprises an encoded bit string that is obtained by encoding a significant bit prefixed bit string, which is either a bit string of only significant bits or a bit string of only don't-care bits or a bit string comprising one or more significant bits to which one or more don't-care bits are suffixed, and
the search key comprises an encoded bit string that is obtained by encoding a significant bit prefixed bit string, and
the encoded bit string is a bit string which is a sequence of bit pairs corresponding to each bit configuring the significant bit prefixed bit string and is a bit string comprising bit pairs with a distinguishing bit which expresses whether the bit is a don't-care bit or a significant bit and, if the bit is a don't-care bit, with a bit with a previously decided value, and, if the bit is a significant bit, with a data bit expressing the value of that bit; and wherein
a search enabled by means of the search key, with any arbitrary node as the search start node, by repeatedly and successively linking to a primary node of a node pair of the link target or a non-primary node that is a pair to that primary node, in accordance with a bit value of the search key at the discrimination bit position included in the branch node, from the root node until the leaf node is reached.

18. The computer-readable storage medium according to claim 17, wherein
the tree data structure is stored in an array and the position information included in a branch node is an array element number of an array element in the array in which is stored the primary node that corresponds to that position information.

* * * * *